US011133736B2

(12) United States Patent
Takahashi et al.

(10) Patent No.: US 11,133,736 B2
(45) Date of Patent: Sep. 28, 2021

(54) VIBRATION ACTUATOR, WEARABLE TERMINAL, AND DEVICE WITH INCOMING NOTIFICATION FUNCTION

(71) Applicants: Yuki Takahashi, Tokyo (JP); Chikara Sekiguchi, Tokyo (JP); Tomoya Ishitani, Tokyo (JP); Shigenori Inamoto, Tokyo (JP)

(72) Inventors: Yuki Takahashi, Tokyo (JP); Chikara Sekiguchi, Tokyo (JP); Tomoya Ishitani, Tokyo (JP); Shigenori Inamoto, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 119 days.

(21) Appl. No.: 16/471,684

(22) PCT Filed: Dec. 19, 2017

(86) PCT No.: PCT/JP2017/045421
§ 371 (c)(1),
(2) Date: Jun. 20, 2019

(87) PCT Pub. No.: WO2018/117066
PCT Pub. Date: Jun. 28, 2018

(65) Prior Publication Data
US 2019/0386552 A1 Dec. 19, 2019

(30) Foreign Application Priority Data
Dec. 20, 2016 (JP) .............................. JP2016-247226

(51) Int. Cl.
*H02K 33/16* (2006.01)
*G08B 6/00* (2006.01)
*H04M 19/04* (2006.01)

(52) U.S. Cl.
CPC ............... *H02K 33/16* (2013.01); *G08B 6/00* (2013.01); *H04M 19/047* (2013.01)

(58) Field of Classification Search
CPC ............ G08B 6/00; B06B 1/04; H02K 33/16; H04M 19/04; H04M 19/047
See application file for complete search history.

(56) References Cited

U.S. PATENT DOCUMENTS

2004/0066097 A1* 4/2004 Kobayashi ............. H02K 33/16
   310/13
2004/0183487 A1 9/2004 Ueda et al.
(Continued)

FOREIGN PATENT DOCUMENTS

JP  2004064852     2/2004
JP  2004064852 A   2/2004
(Continued)

OTHER PUBLICATIONS

International Search Report from International Application No. PCT/JP2017/045421 dated Mar. 6, 2018.

*Primary Examiner* — Naishadh N Desai
(74) *Attorney, Agent, or Firm* — Brundidge & Stanger, P.C.

(57) ABSTRACT

In the movable body one of a magnet and a core that has a magnetic pole surface disposed so as to face a magnetic pole surface of the magnet via an air gap and around which a coil is wound is provided on each of both sides across the shaft of the support shaft part in the movable body, and in the fixing body the other is provided facing the magnet or core disposed on both sides of the shaft of the support shaft part in the movable body. The movable body is elastically supported by magnetic attractive force generated between the magnetic pole surfaces at each of both sides across the shaft and vibrates back and forth in the direction of the shaft (Continued)

of the support shaft part with respect to the fixing body by the coil interacting with the magnet.

23 Claims, 30 Drawing Sheets

(56) References Cited

U.S. PATENT DOCUMENTS

| | | | | |
|---|---|---|---|---|
| 2008/0036309 A1* | 2/2008 | Toyama | ............... | H02K 26/00 |
| | | | | 310/36 |
| 2008/0174187 A1* | 7/2008 | Erixon | ................ | H02K 33/16 |
| | | | | 310/15 |
| 2011/0101796 A1 | 5/2011 | Odajima | | |
| 2013/0342035 A1* | 12/2013 | Kim | .................... | H02K 33/00 |
| | | | | 310/25 |
| 2015/0137627 A1 | 5/2015 | Katada | | |
| 2018/0219465 A1* | 8/2018 | Katada | ................. | B06B 1/045 |
| 2018/0301969 A1* | 10/2018 | Takahashi | ........... | H02K 33/18 |

FOREIGN PATENT DOCUMENTS

| | | |
|---|---|---|
| JP | 2004274997 A | 9/2004 |
| JP | 4875133 B2 | 12/2011 |
| JP | 2015-095943 A | 5/2015 |
| JP | 2015112013 A | 6/2015 |
| JP | 2018019514 A | 2/2018 |
| WO | 2014/130946 A1 | 8/2014 |

* cited by examiner

VIBRATION ACTUATOR, WEARABLE TERMINAL, AND DEVICE WITH INCOMING NOTIFICATION FUNCTION

TECHNICAL FIELD

The present invention relates to a vibration actuator, a wearable terminal, and a device with incoming notification function.

BACKGROUND ART

Hitherto, a vibration actuator is known as a vibration generation source that notifies a user of the incoming and the like in a mobile information terminal such as a mobile phone, or as a vibration generation source that transmits the operation feel of a touch screen or the presence feeling of an amusement apparatus such as a controller of a gaming machine to fingers and thumbs, hands and feet, and the like (for example, see Patent Literature (hereinafter, referred to as "PTL") 1).

The vibration actuator illustrated in PTL 1 is formed in a flat plate-like shape to reduce the size. The vibration actuator in PTL 1 has a flat plate-like shape that slidably supports a shaft-supported movable part by a shaft.

A vibration actuator disclosed in PTL 2 includes a stator including a casing and a coil, and a movable element including magnets 5 and weight parts disposed in the casing, and the movable element that is slidable with respect to the shaft linearly vibrates in a vibration direction with respect to the stator in cooperation with the coil and the magnets. The coil is wound around the outer side of the movable part including the magnets.

PTL 3 is an actuator based on the Voice Coil Motor (VCM) principle including flat coils disposed so as to face each other, and a flat magnet disposed above the flat coils.

In any of the vibration actuators, the movable element is slidably provided on the shaft, and is elastically supported by springs so as to be able to vibrate in the vibration direction. In the vibration actuator in which the VCM is the driving principle, the magnetic attraction force normally does not work due to the magnetic circuit configuration thereof. Therefore, metal springs mainly hold the movable part in an elastic manner. The vibration actuators are conceived to be mounted on a ring-like wearable terminal (also referred to as an input device) having a vibration communication function that provides sensory stimulation by applying vibration to a wearer on the basis of information and the like from a remote communication device, for example, as described in PTL 4.

CITATION LIST

Patent Literature

PTL 1
Japanese Patent Application Laid-Open No. 2015-095943
PTL 2
Japanese Patent Application Laid-Open No. 2015-112013
PTL 3
Japanese Patent No. 4875133
PTL 4
WO 2014/130946

SUMMARY OF INVENTION

Technical Problem

Incidentally, when the vibration actuator is applied to a mobile terminal, a wearable terminal, and the like, and is mounted as a device with an incoming notification function that applies the incoming to the wearer as vibration, it is desired that vibration that applies sufficient bodily sensation to the wearer be provided without variation.

It is also desired that the thickness of the vibration actuator to be mounted on the device with incoming communication function be reduced and the vibration actuator itself be downsized while applying sufficient bodily sensation to the wearer.

In the configuration in which the thickness is reduced, a structure different from the configuration in which a space is secured in the thickness direction of the vibration actuator by disposing the coil on the outer periphery of the magnet or disposing the magnet on the coil as described in PTL 1 and PTL 2 is conceived. In the structure, a magnet is movably supported by a shaft part along the axial direction of the shaft part, a core around which a coil is wound is disposed on the side of the magnet, and a movable body including the magnet is vibrated in cooperation with the magnet and the coil.

However, in the vibration actuator having a support shaft structure, when the movable body is vibrated in cooperation with the core and the magnet provided in a fixing body and the movable body, normal force is generated on the shaft by the magnetic attraction force of the coil and the magnet, and frictional force is generated on the movable body. Meanwhile, it can be conceived to increase the magnetic force of the magnet in order to increase the thrust for moving the movable body, or reduce the air gap in order to reduce the magnetic loss. However, with those responses, there is a problem in that the normal force increases, which leads to the increase in the frictional force.

In the vibration actuator using the resonance phenomenon, when the spring constant that is determined by components including elasticity applying functions such as the coil springs, the magnetic springs, or the like that elastically support the movable body is linear (a fixed value), the characteristics with respect to the frequency become steep characteristics near the resonance point. Therefore, when the vibration actuator is driven while the frequency is fixed, there is a problem in that the variation in the vibration characteristics increases due to the deviation in resonance.

An object of the present invention is to provide a vibration actuator that is capable of being downsized and vibrates suitably and efficiently, a wearable terminal, and a device with incoming notification function.

Solution to Problem

An aspect of the vibration actuator of the present invention includes:
a fixing body;
a support shaft part; and
a movable body to be movably supported with respect to the fixing body via the support shaft part, wherein:
one of a set of magnets or cores is provided respectively on both sides of the movable body across a shaft of the support shaft part, the cores each comprising a magnetic pole surface disposed while facing a magnetic pole surface of a corresponding one of the magnets via an air gap, the cores each being provided with a coil, wherein the magnetic pole surfaces of the one of the set of magnets or cores are disposed outwardly in a direction orthogonal to the shaft of the support shaft part,
another of the set of magnets or cores is provided in the fixing body so as to face the one of the set of magnets or cores disposed respectively on both sides of the shaft of the support shaft part in the movable body; and the movable body is elastically supported by a magnetic attraction force generated between the magnetic pole surfaces of the cores and the magnets respectively on both sides across the shaft, and vibrates in a reciprocating manner in an axial direction of the support shaft part with respect to the fixing body by the coil cooperating with the magnet by excitation of the coil caused by supplying electric power.

A wearable terminal of the present invention includes a configuration in which the vibration actuator described above is mounted. Further, a device with incoming notification function of the present invention includes: a communication apparatus mounted on the device, the communication apparatus being configured to receive a signal from outside; and the vibration actuator described above which is mounted on the device, the vibration actuator being configured to vibrate upon incoming in the communication apparatus.

Advantageous Effects of Invention

According to the present invention, the vibration actuator that is capable of being downsized and vibrates suitably and efficiently can be realized.

DESCRIPTION OF EMBODIMENTS

Embodiments of the present invention are described in detail below with reference to the accompanying drawings.

Embodiment 1

Figure 1:
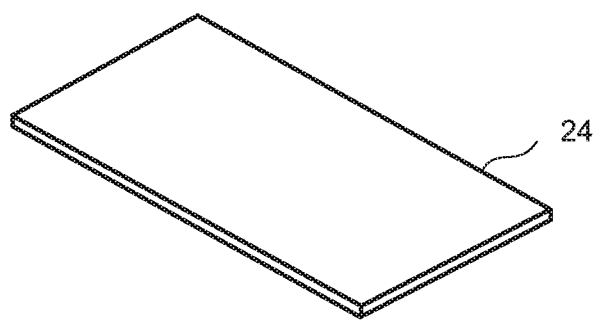
FIG. 1 is a perspective view illustrating the inner configuration of a vibration actuator of Embodiment 1 according to the present invention.
Figure 1:
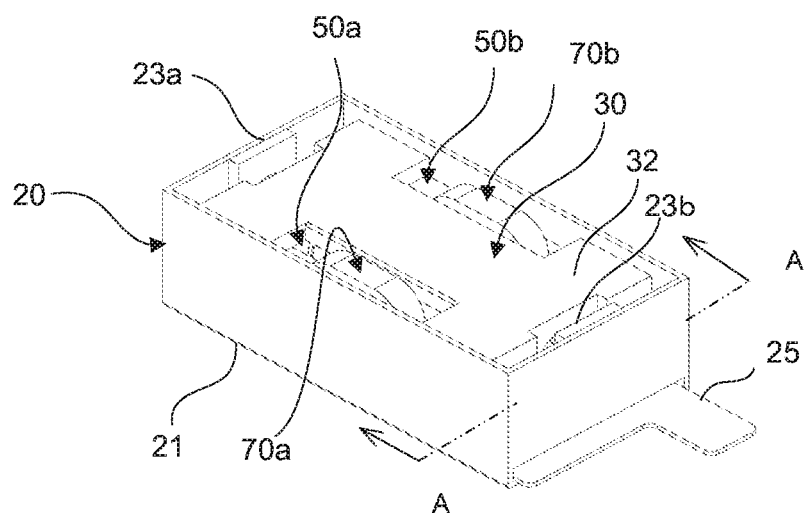
Figure 2:
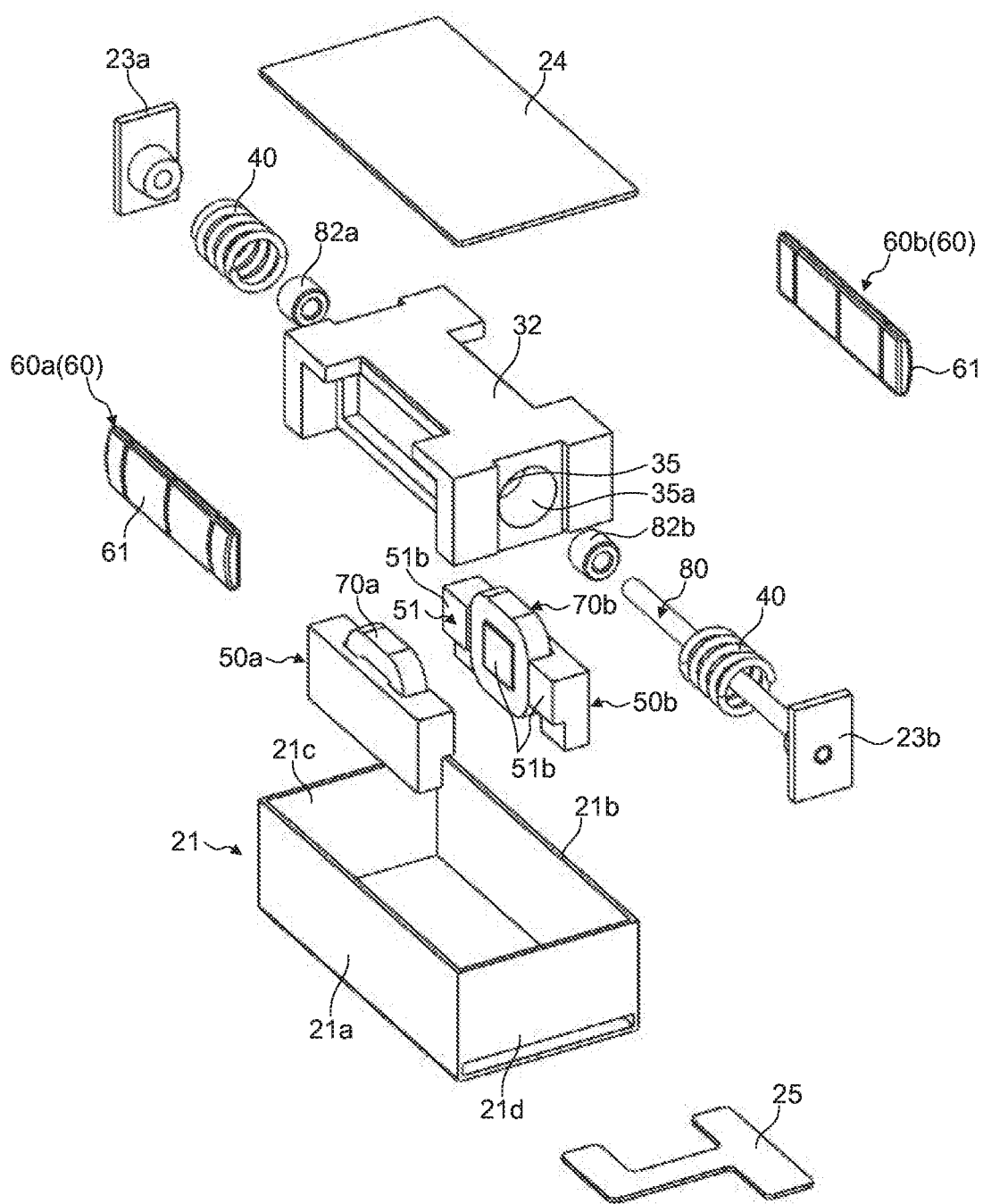
FIG. 2 is an exploded perspective view of the vibration actuator of Embodiment 1 seen from above.
Figure 3:
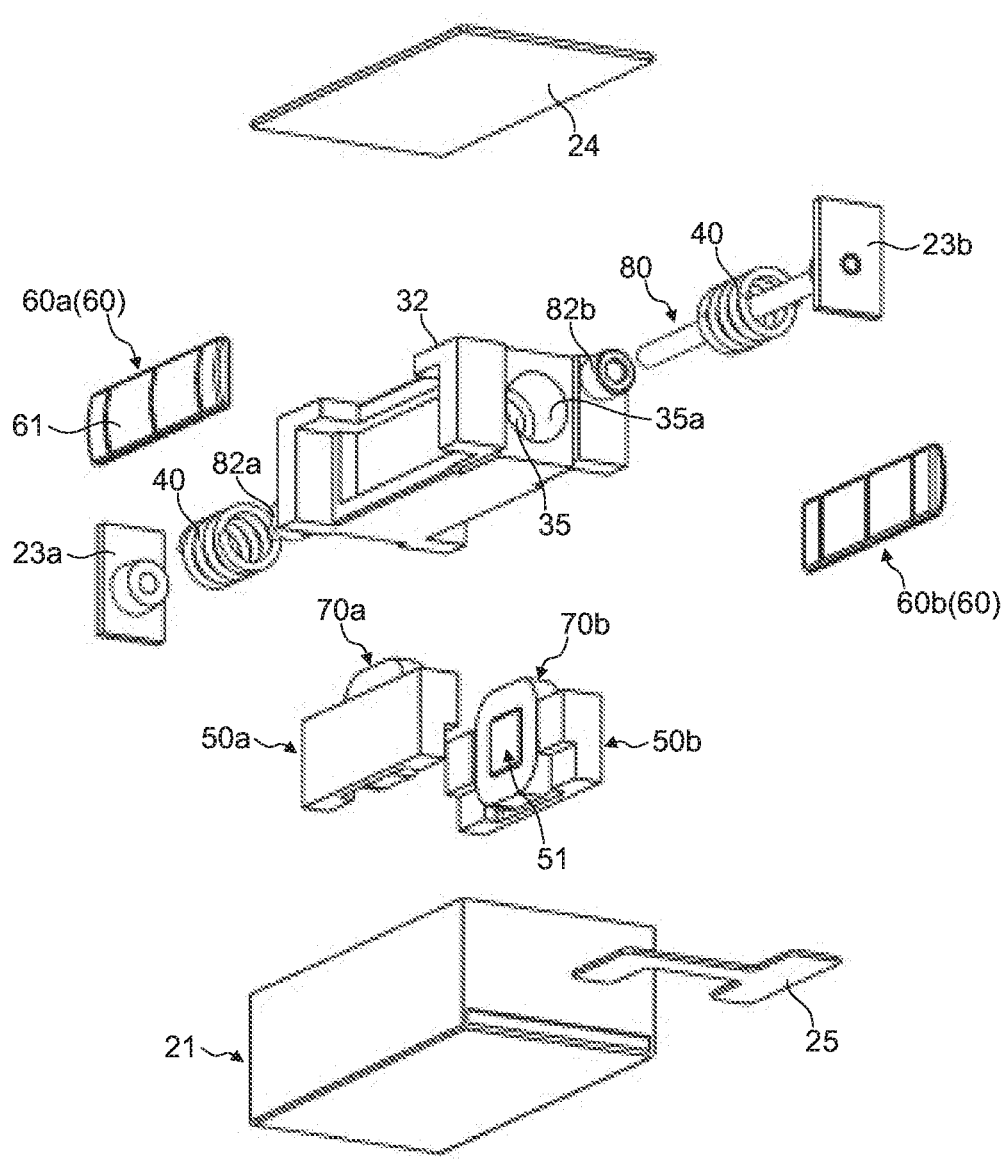
FIG. 3 is an exploded perspective view of the vibration actuator of Embodiment 1 seen from below.
Figure 4:
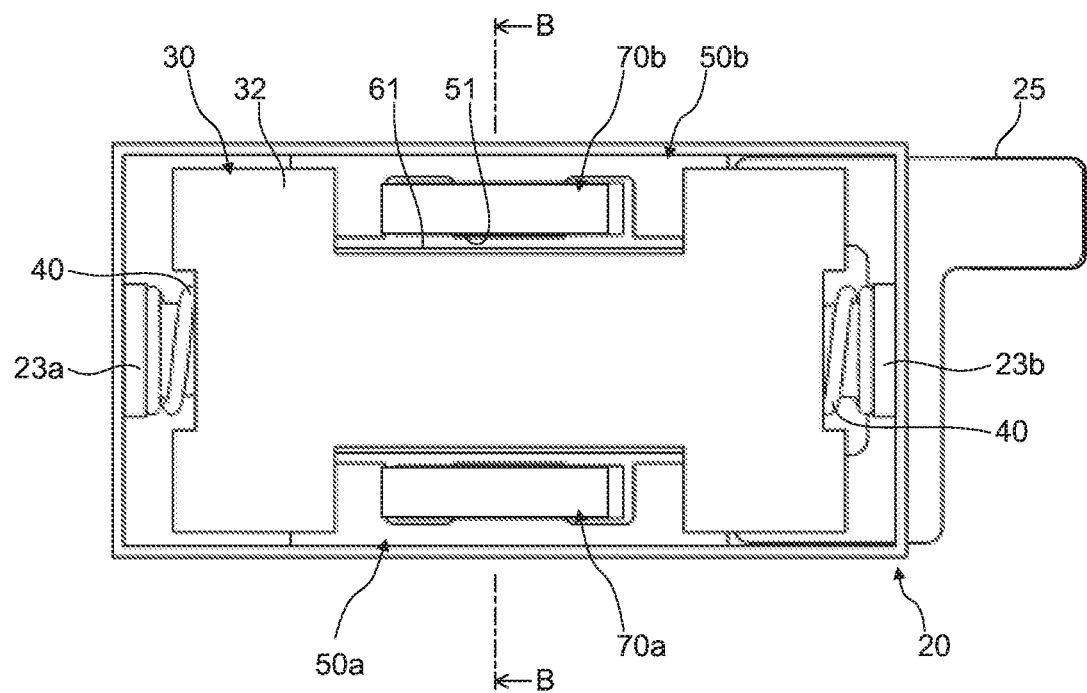
FIG. 4 is a plan view illustrating the inner configuration of the vibration actuator of Embodiment 1.
Figure 5:
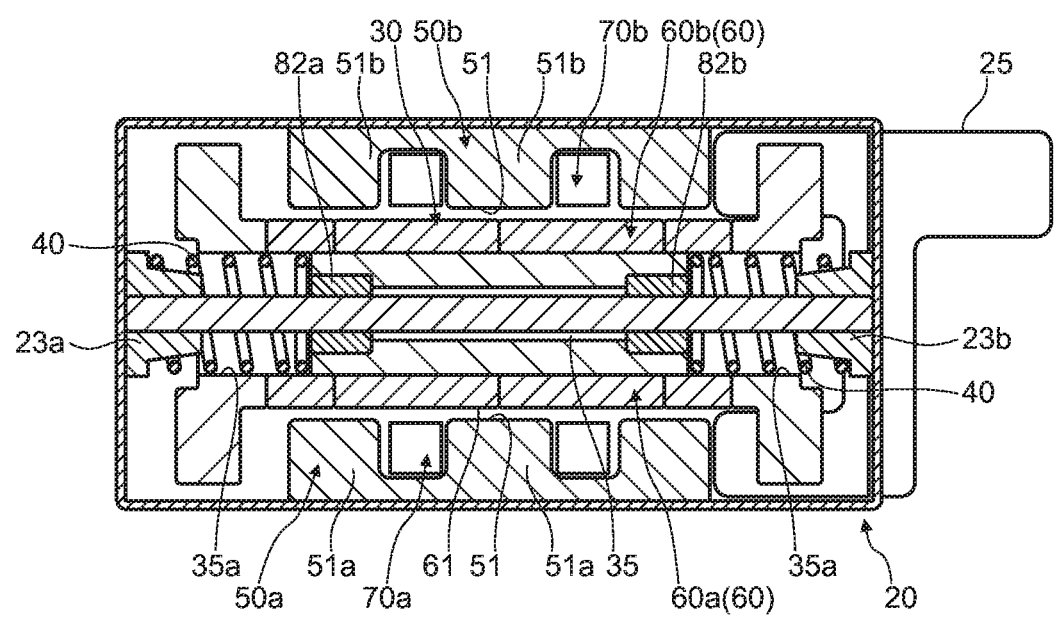
FIG. 5 is an arrow cross-sectional view taken along line A-A in FIG. 1.
Figure 6:
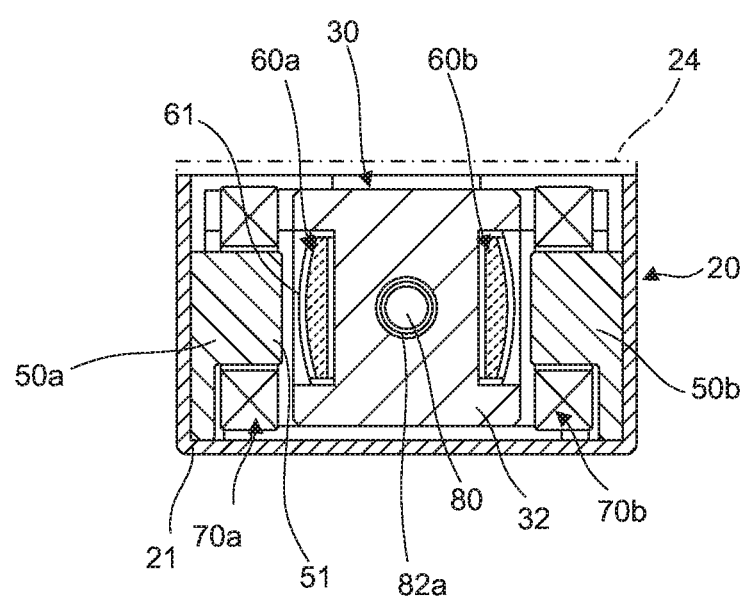
FIG. 6 is an arrow cross-sectional view taken along line B-B in FIG. 4.
Figure 7:
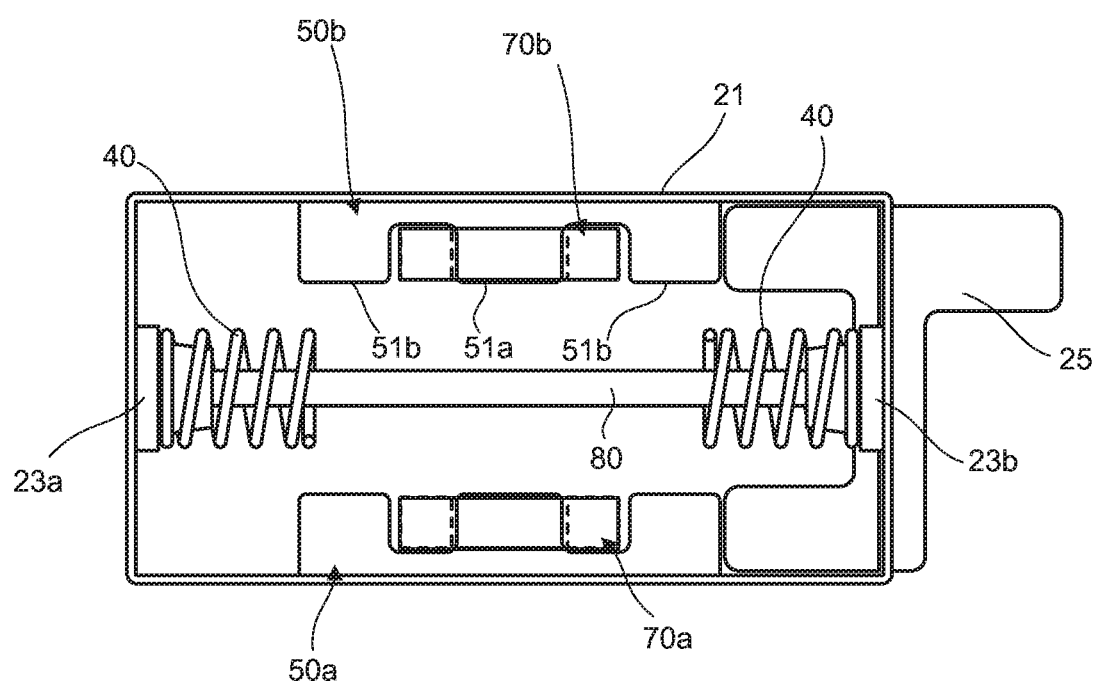
FIG. 7 is a plan view illustrating a main part configuration of a fixing body of the vibration actuator.
Figure 8A:
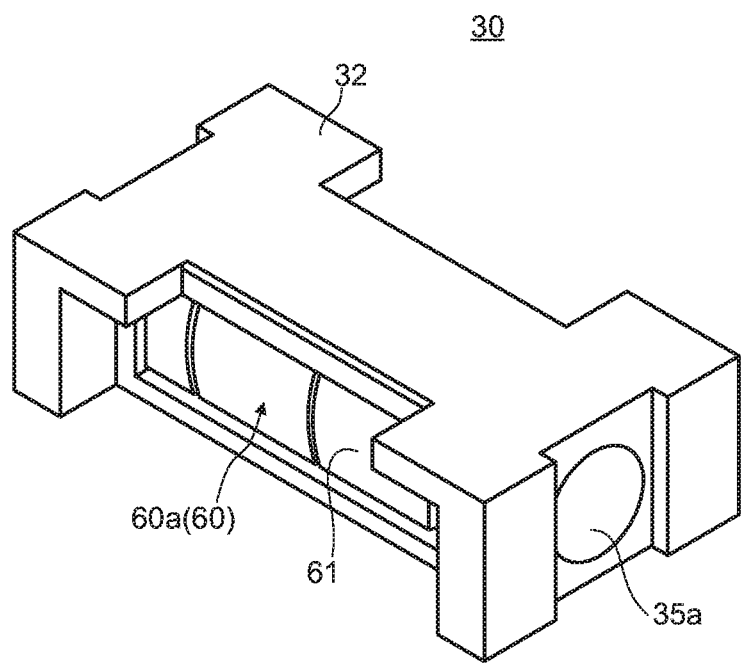
FIG. 8A is a perspective view illustrating a movable body of the vibration actuator.
Figure 8B:
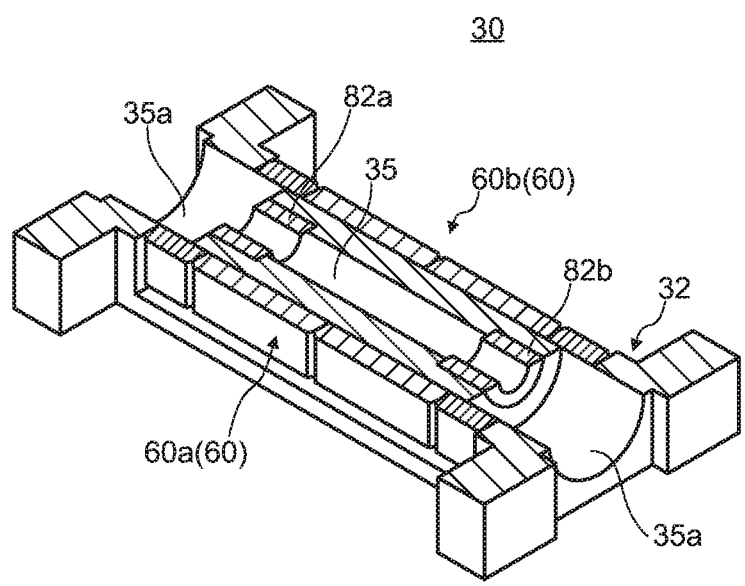
FIG. 8B is a cross-sectional view of the movable body.

FIG. 1 is an external view illustrating the configuration of a vibration actuator of Embodiment 1 according to the present invention, and is a perspective view illustrating the inner configuration of the vibration actuator of Embodiment 1 whose cover is removed. FIG. 2 is an exploded perspective view of the vibration actuator of Embodiment 1 seen from above, FIG. 3 is an exploded perspective view of the vibration actuator of Embodiment 1 seen from below, and FIG. 4 is a plan view illustrating the inner configuration of the vibration actuator of Embodiment 1. FIG. 5 is an arrow cross-sectional view taken along line A-A in FIG. 1, and FIG. 6 is an arrow cross-sectional view taken along line B-B in FIG. 4. FIG. 7 is a plan view illustrating a main part configuration of a fixing body of the vibration actuator, FIG. 8A is a perspective view illustrating a movable body of the vibration actuator, FIG. 8B is a cross-sectional view of the movable body, and FIG. 9 is a plan view schematically illustrating a magnetic circuit of the vibration actuator.

Note that, when the vibration actuator in each embodiment is described in FIG. 11 to FIG. 29 in addition to FIG.

Figure 9:
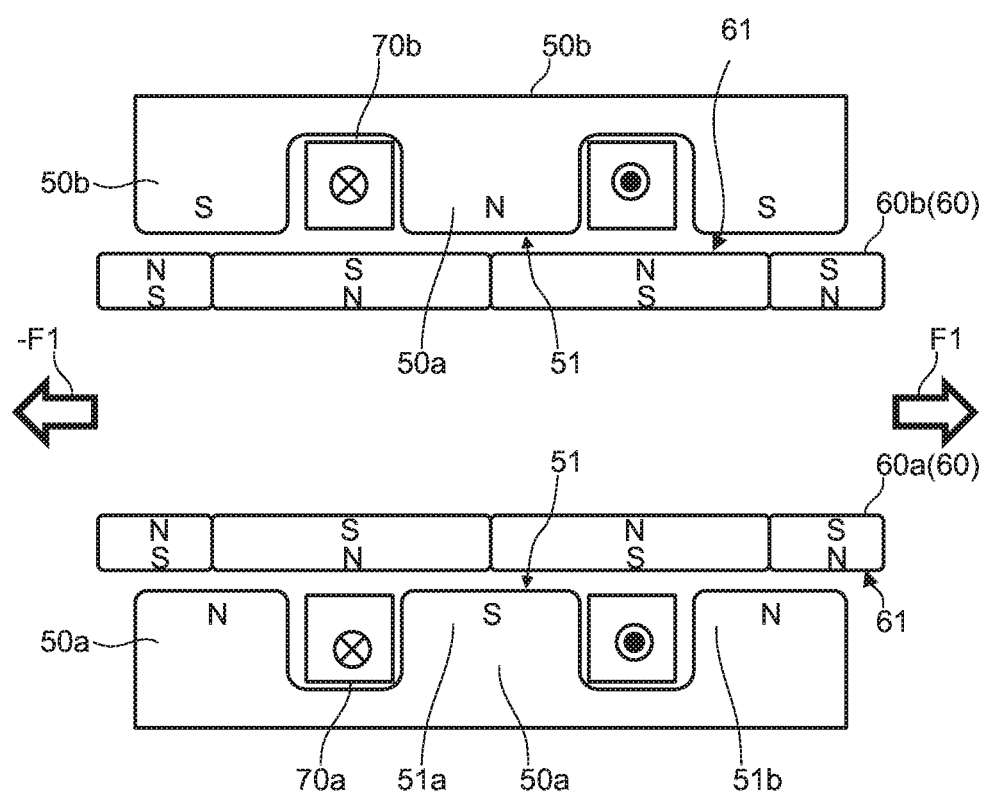
FIG. 9 is a plan view schematically illustrating a magnetic circuit of the vibration actuator.

1 to FIG. 9, the vibration direction of the movable body in the vibration actuator is also referred to as the front-back direction for convenience, and the two directions orthogonal to the vibration direction are described as the transverse direction (crosswise direction) and the height direction (the vertical direction, also referred to as the thickness direction).

<Entire Configuration of Vibration Actuator 10>

Vibration actuator 10 illustrated in FIG. 1 has a flat plate-like shape in which the height (the length in the vertical direction in the accompanying drawings and corresponds to the thickness) is shorter than the width (the crosswise direction in the accompanying drawings).

Vibration actuator 10 of this embodiment includes fixing body 20, shaft part 80, and movable body 30 movably supported with respect to fixing body 20 via shaft part 80.

Movable body 30 reciprocates, that is, vibrates along the axial direction of shaft part 80 in cooperation with cores (hereinafter also referred to as "E-shaped cores") 50a and 50b around which coils 70a and 70b are wound, and magnets 60.

In vibration actuator 10 of this embodiment, in movable body 30, magnets 60a and 60b are provided on both side parts along the axial direction across the shaft of shaft part 80, and cores 50a and 50b having protruding parts (magnetic pole parts) 51a around which coils 70a and 70b are wound are provided in positions facing magnets 60a and 60b over air gaps. Magnets 60a and 60b, and E-shaped cores 50a and 50b around which coils 70a and 70b are wound are disposed so that magnetic pole surfaces (magnetic pole surfaces of E-shaped cores 50a and 50b) 61 and 51 thereof face each other. Magnetic pole surfaces 61 of magnets 60a and 60b are disposed toward the outside in the direction orthogonal to the shaft of shaft part 80, and the magnetized surfaces of E-shaped cores 50a and 50b face each other so as to be opposite thereto. Magnets 60a and 60b, and cores 50a and 50b around which coils 70a and 70b are wound form magnetic force generating parts, and the magnetic force generating parts function as magnetic springs by means of magnetic attraction forces on both sides of shaft part 80. As a result, movable body 30 is elastically supported in a state in which the rotation about the shaft is suppressed and so as to be movable in the axial direction. The magnetic attraction forces are generated so as to be symmetric about shaft part 80 (the shaft of shaft part 80) across shaft part 80 (the shaft of shaft part 80). Movable body 30 is attracted toward both sides by the magnetic attraction forces generated on both sides. Therefore, the magnetic attraction forces offset each other, to thereby be balanced. As a result, the rotation of movable body 30 is suppressed and movable body 30 is held in a position in which movable body 30 is in a horizontal state that is a reference position. In this embodiment, metal springs 40 that elastically support movable body 30 so that movable body 30 is returnable when movable body 30 moves in the axial direction are included in addition to the magnetic springs.

Vibration actuator 10 is specifically described.

In vibration actuator 10 of this embodiment, shaft part 80 is fixed to fixing body 20, and movable body 30 includes bearing parts 82a and 82b in which shaft part 80 is inserted.

Fixing body 20 includes case 21, spring holders 23a and 23b, coils 70a and 70b, E-shaped cores 50a and 50b that are each partitioned by slits formed in one surface of a rectangular shape, have a plurality of protruding parts formed thereon, and have coils 70a and 70b disposed in the slits, and power supply section 25. In fixing body 20, an opening part opened upward in case 21 is covered with cover 24.

Meanwhile, movable body 30 includes pair of magnets 60a and 60b in which a plurality of magnetic poles (four poles in this embodiment) are alternately disposed in the longitudinal direction, and movable body main body 32 to which magnets 60a and 60b and bearing parts 82a and 82b are fixed. Movable body 30 is elastically supported by metal springs 40. Metal springs 40 are cylindrical coil springs, for example.

In vibration actuator 10, movable body 30 (magnets 60a and 60b, movable body main body 32, and bearing parts 82a and 82b) is elastically supported by the biasing forces of metal springs 40 in the axial direction and the magnetic springs by means of the magnetic attraction forces generated by magnets 60a and 60b and E-shaped cores 50a and 50b around which coils 70a and 70b are wound.

<Fixing Body 20 of Vibration Actuator 10>

Case 21 is formed in a rectangular box shape having a bottom surface part, and E-shaped cores 50a and 50b are disposed on both side walls along the longitudinal direction so as to face each other. In case 21, shaft part 80 is installed between both end walls 21c and 21d that close both end parts of each of both side walls 21a and 21b.

Shaft part 80 is disposed along the longitudinal direction of case 21 and in the center of case 21 in the width direction, and both end parts thereof are fixed to both end walls 21c and 21d via spring holders 23a and 23b in a state in which shaft part 80 is inserted through bearing parts 82a and 82b of movable body 30. As a result, shaft part 80 is supported by both end walls 21c and 21d. Shaft part 80 is fixed to end walls 21c and 21d by being press fitted into fixing holes in spring holders 23a and 23b or being fixed by bonding and the like after the insertion. Note that shaft part 80 is slidably inserted through bearing parts 82a and 82b, but bearing parts 82a and 82b may be copper-based, iron-based, or iron-copper based oil-retaining bearings, or may be magnetic bodies.

Metal springs 40 are inserted around shaft part 80 across movable body 30 including bearing parts 82a and 82b in the longitudinal direction. Metal springs 40 bias movable body 30 disposed on shaft part 80 so that movable body 30 is positioned in the central part in the longitudinal direction via bearing parts 82a and 82b. Note that case 21 forms a hollow electromagnetic shield by mounting cover 24 thereon.

E-shaped cores 50a and 50b are magnetic bodies in this embodiment, and are formed in same shapes that are symmetrical about the shaft of shaft part 80. E-shaped cores 50a and 50b include plurality of protruding parts 51a and 51b whose distal end surfaces serve as magnetic pole surfaces 51. Plurality of protruding parts 51a and 51b of E-shaped cores 50a and 50b are each disposed on one side surface so as to be lined up in the extending direction of one side surface. Note that it is preferred that magnetic pole surfaces 51 be disposed so as to be parallel to shaft part 80 and both side walls 21a and 21b of case 21, and parallel to magnetic pole surfaces 61 of magnets 60a and 60b. Note that E-shaped cores 50a and 50b may be formed of electromagnetic stainless steel, a sintered material, a metal injection molding (MIM) material, a lamination steel sheet, an electrogalvanized sheet steel (SECC: steel electrolytic cold commercial), and the like.

E-shaped cores 50a and 50b are formed in E-shapes in planar view. In detail, E-shaped cores 50a and 50b have E-shapes in planar view each having slits formed in one side of a rectangular parallelepiped along the longitudinal direction so as to divide the side into three in the longitudinal direction, and having protruding parts 51a and 51b on one surface sides. In E-shaped cores 50a and 50b, coils 70a and 70b pass through the slits, and coils 70a and 70b are disposed so as to be wound only around center protruding parts 51a and 51b among protruding parts 51a and 51b of E-shaped cores 50a and 50b. Coils 70a and 70b are formed of copper wire and the like, for example. When coils 70a and 70b are excited by carrying electric current, protruding parts 51a and 51b on both sides located across center protruding parts 51a and 51b are excited in a polarity opposite to that of center protruding parts 51a and 51b in E-shaped cores 50a and 50b. Note that, for E-shaped cores 50a and 50b, the magnetic pole surfaces of protruding parts 51a and 51b that face each other are preferred to be excited in different polarities. As a result, the magnetic circuit configuration in vibration actuator 10 becomes efficient.

Coils 70a and 70b are wound around center protruding parts 51a and 51b in E-shaped cores 50a and 50b, and are connected to power supply section 25. Coils 70a and 70b are disposed so as to surround the magnetic pole surfaces that are the distal end surfaces of center protruding parts 51a and 51b in magnetic pole surfaces 51 facing magnetic pole surfaces 61 of magnets 60a and 60b. Coils 70a and 70b excite protruding parts 51a and 51b by being supplied with electric power from power supply section 25, and the polarities of other protruding parts 51a and 51b located across center protruding parts 51a and 51b have the same polarity in E-shaped cores 50a and 50b.

Power supply section 25 is a board that supplies electric power to coils 70a and 70b, and is formed from a board, for example, a flexible circuit board (FPC: Flexible printed circuits) and the like connected to an external power supply. Power supply section 25 is connected to coils 70a and 70b in case 21.

<Movable Body 30 of Vibration Actuator 10>

As illustrated in FIG. 1 and FIG. 4 to FIG. 6, movable body 30 is disposed so as to be movable in the extending direction of shaft part 80 in case 21 in fixing body 20. Movable body 30 includes movable body main body 32, magnets 60a and 60b, and bearing parts 82a and 82b.

In movable body main body 32, bearing parts 82a and 82b through which shaft part 80 is inserted, and magnets 60a and 60b that are disposed across shaft part 80 that is inserted via bearing parts 82a and 82b are integrally mounted.

Movable body main body 32 functions as a weight of movable body 30, and it is preferred that iron such as an SECC, alloy mainly composed of iron, a metal material whose specific gravity is 5 or more such as bronze and copper, a sintered material, and a metal injection molding (MIM) material, for example, be employed. As movable body main body 32, high specific-gravity metal material (preferably a specific gravity of 10 or more, particularly a specific gravity of 11 or more) such as tungsten or tungsten alloy is suitable, for example. In this embodiment, movable body main body 32 is made of tungsten. For example, as a standard specific gravity, an SECC is 7.8, an Nd-sintered magnet is 7.4 to 7.6, copper is 8.9, and tungsten is 16 to 19.

Movable body main body 32 is formed in an H-shape in planar view in which central parts of both side surfaces of a rectangular parallelepiped extending along the longitudinal direction of case 21 are cut off. In other words, movable body main body 32 forms an H-shape with the body of the rectangular shape, and a front projecting part and a rear projecting part projecting to the vibration direction on both ends of the body in the vibration direction. Magnets 60a and 60b are disposed on the bottom surface parts in the recessed shapes of the H-shape of movable body main body 32, that is, on both side surfaces along the axial direction in the body.

In case 21, E-shaped cores 50a and 50b are disposed in the recessed shapes of movable body 30 with a gap therebetween, and case 21 has a configuration in which the clearance in case 21 is reduced as much as possible in planar view, to thereby obtain downsizing.

Bearing parts 82a and 82b are parts through which shaft part 80 is inserted, and is formed from sintered sleeve bearings, for example. Bearing parts 82a and 82b are provided in movable body main body 32 so that shaft part 80 is positioned on the central axis of movable body main body 32. In this embodiment, bearing parts 82a and 82b are fixed with the same axial center on both end parts of through hole 35 that passes through the central axis of movable body main body 32 and is formed so as to be continuous to spot facing parts 35a formed in the center parts of the front end surface of the front projecting part and the rear end surface of the rear projecting part. One end part of each of metal springs 40 is inserted in spot facing parts 35a, and metal springs 40 are locked on the bottom surfaces of the spot facing parts.

Movable body main body 32 is elastically supported via metal springs 40. As a result, when coils 70a and 70b are not supplied with electric power, movable body 30 is biased to be positioned in the center in case 21 (fixing body 20) in the longitudinal direction by metal springs 40 in addition to the function of the magnetic springs.

Magnets 60a and 60b include magnetic pole surfaces 61 serving as a plurality of magnetic poles, and are disposed across shaft part 80 so that magnetic pole surfaces 61 face the opposite sides. In this embodiment, magnets 60a and 60b are fixed on both side surfaces of movable body main body 32 through which shaft part 80 is inserted along the longitudinal direction so as to be parallel to shaft part 80 and so that magnetic pole surfaces 61 face both sides. In this embodiment, as illustrated in FIGS. 2, 3, 5, 8A, 8B, and FIG. 9, four different magnetic poles are alternately disposed on magnetic pole surfaces 61. In this embodiment, different magnetic poles are disposed so as to be positioned in opposite directions in a direction orthogonal to shaft part 80 (see FIG. 9). Magnets 60a and 60b are disposed so as to face the magnetic pole surfaces of E-shaped cores 50a and 50b and line up with alternately different polarities in the longitudinal direction of case 21 (axial center direction). Note that magnets 60a and 60b may be formed from alternately lining up different magnets (magnet pieces) with a plurality of magnetic poles, or may be magnetized so as to have alternately different magnetic properties. The same applies to magnets in the embodiments described below. Note that magnets 60a and 60b may be formed from Nd-sintered magnets and the like, for example.

Magnetic pole surfaces 61 are disposed so as to face and be parallel to magnetic pole surfaces 51 of E-shaped cores 50a and 50b over predetermined intervals (air gaps).

As illustrated in FIG. 2, FIG. 3, FIG. 6, and the like, magnetic pole surfaces 61 of magnets 60a and 60b are each formed in a center-protruding shape that is a trapezoidal shape or a curved surface in which the center part in the height direction is the closest to facing magnetic pole surface 51. In this embodiment, magnetic pole surfaces 61 are each formed as a curved surface in which the center part in the height direction is the closest to the magnetic pole surface. As a result, the force (torque) that stops movable body 30 with respect to the rotation direction acts on movable body 30 so as to stop movable body 30 in the center in the rotation direction. As a result, movable body 30 can be placed in a state in which movable body 30 is disposed so as to be substantially horizontal and stable, the contact of movable body 30 with fixing body 20, that is, interference among parts can be prevented, and stable driving can be realized. Note that, when movable body 30 rotates, it becomes difficult for magnets 60a and 60b to come into contact with magnetic pole surfaces 51 of E-shaped cores 50a and 50b.

In this embodiment, the areas of magnetic pole surfaces 61 and magnetic pole surfaces 51 that face each other in the limited space in case 21 are increased as much as possible, and the magnetic flux is efficiently concentrated and the output is increased when the magnetic circuit is driven.

In this embodiment, in case 21, E-shaped cores 50a and 50b that are magnetic bodies are disposed so as to face magnets 60a and 60b disposed across shaft part 80, and hence magnetic attraction forces are generated between E-shaped cores 50a and 50b and magnets 60a and 60b. The generated magnetic attraction forces are generated on the same straight line across shaft part 80 and in opposite directions in separating directions, and hence offset each other. By those magnetic attraction forces, the inclination of movable body 30 that pivots around shaft part 80 is removed, movable body 30 is placed in a positioned state (the positioning of the movable body), and the rotation about shaft part 80 is restricted (so-called rotation stop). Magnetic pole surfaces 61 of magnets 60a and 60b are formed in center-protruding shapes in which the center parts in the height direction or the rotation direction are the closest to magnetic pole surfaces 51 of E-shaped cores 50a and 50b. Therefore, movable body 30 is disposed in a position in which movable body 30 is not inclined and pivots around shaft part 80 without being attracted to one side of E-shaped cores 50a and 50b located across movable body 30, that is, disposed in a substantially horizontal and stable state. Note that, in this embodiment, movable body 30 is elastically supported by the magnetic attraction forces that are so-called magnetic springs between E-shaped cores 50a and 50b and magnets 60a and 60b, and metal springs 40 (mechanical springs) that sandwich movable body 30 therebetween in the axial direction. Note that it goes without saying that it is possible to elastically support movable body 30 by only the magnetic attraction forces that are so-called magnetic springs between E-shaped cores 50a and 50b and magnets 60a and 60b.

E-shaped cores 50a and 50b are excited when coils 70a and 70b are supplied with power supply from power supply section 25. As a result, the distal end surfaces of protruding parts 51a and 51b are magnetized, to thereby have magnetic poles, and thrust is generated in accordance with the relationship between the magnetic poles of magnets 60a and 60b that are disposed so as to face each other. By changing the direction of the electric current to be supplied to coils 70a and 70b, movable body 30 including magnets 60a and 60b reciprocates (vibrates in a reciprocating manner) in the longitudinal direction that is the axial direction, that is, the vibration direction.

In this embodiment, for example, as illustrated in FIG. 9, the polarities (magnetic pole surfaces 61) of magnet 60a are disposed in the order of an S pole, an N pole, an S pole, and an N pole from the front side to the rear side, and are disposed so as to be lined up in the longitudinal direction while facing magnetic pole surface 51 of core 50a. Meanwhile, the polarities (magnetic pole surfaces 61) of magnet 60b are disposed in the order of an N pole, an S pole, an N pole, and an S pole from the front side to the rear side, and are disposed so as to be lined up in the longitudinal direction while facing magnetic pole surface 51 of core 50b. In other words, in this embodiment, the number of polarities facing each other in magnets 60a and 60b and E-shaped cores 50a and 50b is 4 for the magnet: 3 for the E-shaped core. Magnets 60a and 60b are disposed so that the opposite polarities across shaft part 80 are the polarities of magnetic pole surfaces 51 of E-shaped cores 50a and 50b faced by magnets 60a and 60b.

E-shaped cores 50a and 50b are excited by supplying electric current to coils 70a and 70b, thereby causing the polarity of center protruding part 51a of E-shaped core 50a facing magnet 60a to be an S pole and the polarity of center protruding part 51b of E-shaped core 50b facing magnet 60b to be an N pole. As a result, the polarities of protruding parts 51a and 51b positioned on both sides of center protruding parts 51a and 51b of E-shaped cores 50a and 50b across center protruding parts 51a and 51b are polarities that are different from the polarities of center protruding parts 51a and 51b (see FIG. 9). As a result, by the magnetic attraction force, thrust is generated in direction F1, and cores 50a and 50b are driven in direction F1. By supplying electric current to coils 70a and 70b in the opposite direction, the polarities of E-shaped cores 50a and 50b are caused to be opposite, that is, the polarity of center protruding part 51a of E-shaped core 50a facing magnet 60a is caused to be an N pole and the polarity of center protruding part 51b of E-shaped core 50b facing magnet 60b is caused to be an S pole. As a result, polarities of protruding parts 51a positioned on both sides of center protruding part 51a of E-shaped core 50a are magnetized as S poles, and the polarities of protruding parts 51b positioned on both sides of center protruding part 51b of E-shaped core 50b facing magnet 60b are magnetized as N poles. Then, movable body 30 including magnets 60a and 60b facing the above are driven in direction −F1 that is directly opposite to direction F1.

In other words, in vibration actuator 10, by the alternating waveform input to coils 70a and 70b from power supply section 25, E-shaped cores 50a and 50b, that is, magnetic pole surfaces 51 of E-shaped cores 50a and 50b (in detail, the distal end surfaces of protruding parts 51a and 51b) are magnetized, and the magnetic attraction force and the repulsive force are effectively generated for magnets 60a and 60b on movable body 30 sides. As a result, magnets 60a and 60b of movable body 30 reciprocate in both directions F (direction F1 and direction −F1) along the longitudinal direction with reference to the position serving as a driving reference position (here, the position in which the center of magnet 60a in the longitudinal direction (axial direction) and the center of facing surface 51 overlap each other, and the center of magnet 60a in the height direction and the center of facing surface 51 in the height direction overlap each other in planar view). In other words, movable body 30 vibrates in a reciprocating manner in a direction along magnetic pole surfaces 61 and 51 of magnets 60a and 60b and E-shaped cores 50a and 50b with respect to fixing body 20. The driving principle is indicated below. Note that the driving principle of vibration actuator 10 of this embodiment is realized by all of the vibration actuators in the embodiments blow.

In vibration actuator 10 of this embodiment, when the mass of movable body 30 is expressed in m [kg], and the spring constant in torsional direction is expressed in $K_{sp}$, movable body 30 vibrates with respect to fixing body 20 at resonance frequency $f_r$ [Hz] calculated by expression 1 below.

[1]

$$f_r = \frac{1}{2\pi}\sqrt{\frac{K_{sp}}{m}}$$ (Expression 1)

Vibration actuator 10 of this embodiment excites E-shaped cores 50a and 50b (in detail, one end surfaces 51 serving as magnetic pole surfaces) via coils 70a and 70b by supplying alternating current at a frequency that is substantially equal to resonance frequency $f_r$ of movable body 30 to coils 70a and 70b from power supply section 25. As a result, movable body 30 can be efficiently driven.

Movable body 30 in vibration actuator 10 is in a state of being supported by a spring-mass system structure that is supported by fixing body 20 via the magnetic springs formed from E-shaped cores 50a and 50b around which coils 70a and 70b are wound and magnets 60a and 60b, and metal springs 40. Therefore, when alternating current at a frequency that is equal to resonance frequency $f_r$ of movable body 30 is supplied to coils 70a and 70b, movable body 30 is driven in a resonant state.

The equation of motion and the circuit equation expressing the driving principle of vibration actuator 10 are expressed below. Vibration actuator 10 is driven on the basis of the equation of motion expressed in expression 2 below and the circuit equation expressed in expression 3 below.

[2]

$$m\frac{d^2x(t)}{dt^2} = K_f i(t) - K_{sp}x(t) - D\frac{dx(t)}{dt}$$ (Expression 2)

m: mass [Kg]
x(t): displacement [m]
$K_f$: thrust constant [N/A]
i(t): electric current [A]
$K_{sp}$: spring constant [N/m]
D: attenuation coefficient [N/(m/s)]

[3]

$$e(t) = Ri(t) + L\frac{di(t)}{dt} + K_e\frac{dx(t)}{dt}$$ (Expression 3)

e(t): voltage [V]
R: resistance [Ω]
L: inductance [H]
$K_e$: counter electromotive force constant [V/(m/s)]

In other words, mass m [Kg], displacement x(t) [m], thrust constant $K_f$ [N/A], electric current i(t) [A], spring constant $K_{sp}$ [N/m], attenuation coefficient D [N/(m/s)], and the like in vibration actuator 10 can be changed, as appropriate, within the range in which expression 2 is satisfied. Voltage e(t) [V], resistance R [Ω], inductance L [H], and counter electromotive force constant $K_e$ [V/(m/s)] can be changed, as appropriate, within the range in which expression 3 is satisfied.

As described above, in vibration actuator 10, a large output can be effectively obtained when driving is performed at resonance frequency $f_r$ that is determined by mass m of movable body 30, and spring constant $K_{sp}$ obtained by superimposing metal springs (elastic bodies, in this embodiment, coil springs) 40 and magnetic springs on each other.

Figure 10A:
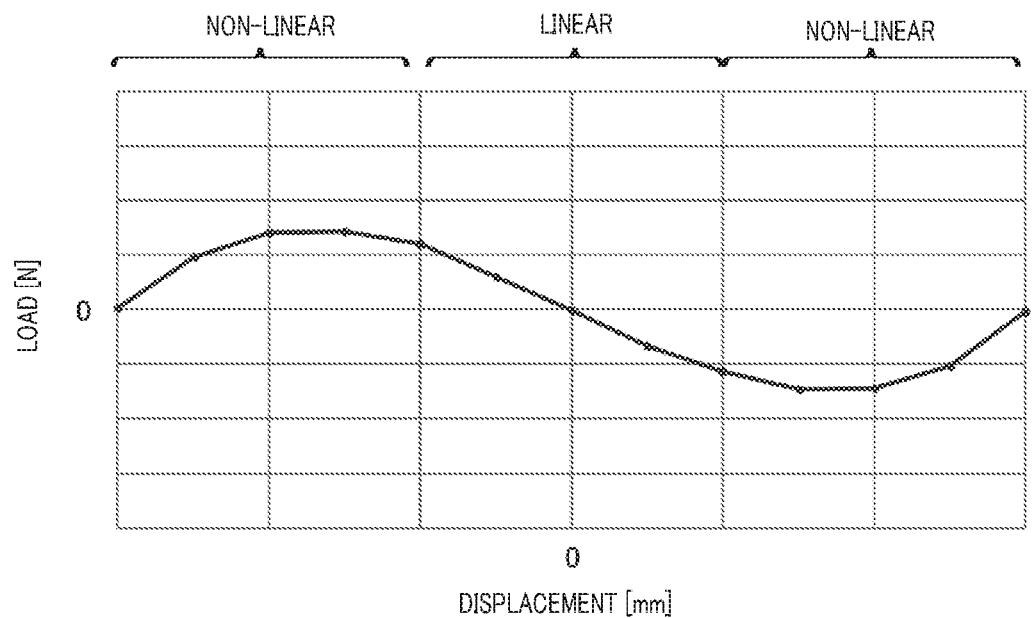
FIG. 10A is a diagram showing the relationship between load and displacement in a magnetic spring.

The springs that elastically support movable body 30 in vibration actuator 10 of this embodiment include metal springs 40, and the magnetic springs formed from E-shaped cores 50a and 50b around which coils 70a and 70b are wound and magnets 60a and 60b, and the magnetic springs have a non-linear spring constant with respect to the displacement as shown in FIG. 10A.

Figure 10B:
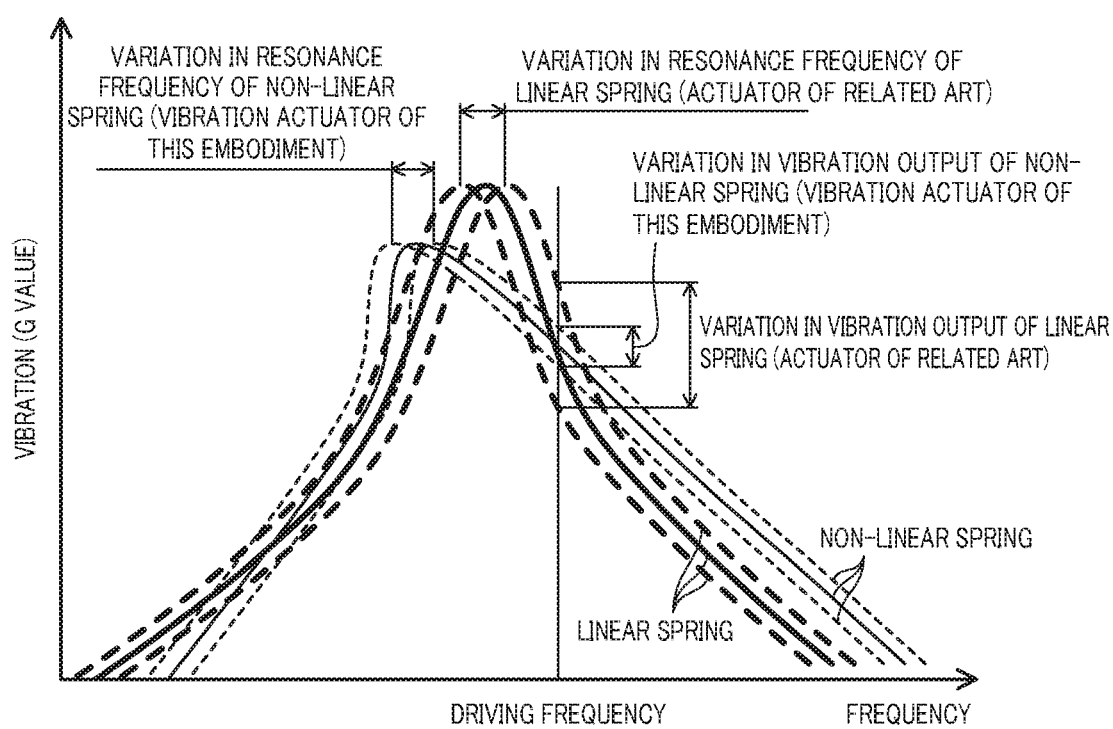
FIG. 10B is a diagram provided for describing the suppression of variation in the vibration output by a nonlinear spring.

In other words, vibration actuator 10 can cause the springs to be non-linear (can cause the spring constant to fluctuate in accordance with the position) because the magnetic springs are used, and can realize a performance that less likely varies because the frequency characteristics can be flatter than the characteristics when the springs are linear (see FIG. 10B).

According to vibration actuator 10, the following effects can be exhibited.

<Effect 1>

Vibration actuator 10 vibrates movable body 30 in the axial direction in cooperation with coils 70a and 70b and magnets 60a and 60b. Vibration actuator 10 includes fixing body 20 including one of coils 70a and 70b and magnets 60a and 60b, and movable body 30 supported so as to be movable in the axial direction with respect to fixing body 20 via shaft part 80, one of coils 70a and 70b and magnets 60a and 60b is provided in movable body 30 so as to include the magnetic pole surfaces in different directions across shaft part 80, and the other of coils 70a and 70b and magnets 60a and 60b is disposed in the fixing body so as to face one of coils 70a and 70b and magnets 60a and 60b provided in the movable body.

According to this configuration, among the magnetic attraction forces generated between coils 70a and 70b (E-shaped cores 50a and 50b) and magnets 60a and 60b across shaft part 80, the normal forces that act on movable body 30 and cause frictional force to be generated are generated in opposite directions across shaft part 80. As a result, the normal forces offset each other and are suppressed. Therefore, the function of the magnetic springs that cause movable body 30 to be driven to the vibration direction by the magnetic attraction forces and the function of stopping the rotation of movable body 30 can be maintained, and vibration actuator 10 that is capable of being downsized and vibrates suitably and efficiently can be obtained.

<Effect 2>

Hitherto, in the vibration actuator using the resonance phenomenon, when the spring constant is linear (a fixed value), the characteristics with respect to the frequency become steep characteristics near the resonance point. Therefore, when the vibration actuator of the related art is driven while the frequency is fixed, the variation in the vibration characteristics increases due to the deviation in resonance (see FIG. 10B).

Meanwhile, vibration actuator 10 of this embodiment uses the magnetic springs formed from magnets 60a and 60b and coils 70a and 70b, and hence can cause the springs to be non-linear (cause the spring constant to fluctuate in accordance with the position of the driving frequency). As a result, when vibration actuator 10 is driven while fixing the frequency, the vibration output can be caused to vary less and the desired vibration output can be obtained by causing the fixed driving frequency to be a driving frequency (see FIG. 10B) at which the frequency characteristics are flatter than the characteristics when the springs are linear.

<Effect 3>

In vibration actuator 10, E-shaped cores 50a and 50b around which coils 70a and 70b are wound provided on both sides in fixing body 20 across shaft part 80 each form a magnetic circuit together with each of facing magnets 60a and 60b faced by E-shaped cores 50a and 50b with one coil, and hence a low-cost structure is obtained, a cost benefit can be realized, and assembly time can be reduced.

<Effect 4>

The magnetic springs including cores 50a and 50b and magnets 60a and 60b that are magnetic bodies are included in addition to metal springs 40, and hence the spring constant of metal springs 40 that elastically support cores 50a and 50b at the reference position can be reduced. As a result, the lifespan of metal springs 40 can be improved and the reliability as vibration actuator 10 can be improved.

<Effect 5>

When the plane-shaped or cylindrical-shaped actuator of the related art is to be mounted on the device with incoming notification function such as a mobile terminal or a wearable terminal or a ring-shaped device (ex. Φ315 mm to 25 mm), a large vibration device is desired in order to generate a vibration that applies sufficient bodily sensation to the user wearing the device. In addition, the vibration characteristics for a stable vibration output without variation is requested.

Meanwhile, when vibration actuator 10 of this embodiment is mounted on the ring-shaped device, sufficient vibration can be efficiently applied to the user without variation even for downsized vibration actuator 10.

<Effect 6>

Movable body main body 32 of movable body 30 is formed with use of tungsten with high specific gravity, and hence the vibration output can be increased by increasing the mass of the movable body itself.

<Effect 7>

In general VCM actuators of the related art, the air gap between the magnetic pole surfaces of the movable body and the fixing body is wide, thereby decreasing the magnetic efficiency. The structure is also complicated, and assembly is not easy. Meanwhile, in vibration actuator 10, coils 70a and 70b excite center protruding parts 51a and 51b of E-shaped cores 50a and 50b, and center protruding parts 51a and 51b generate thrust together with protruding parts 51a and 51b on both sides of center protruding parts 51a and 51b by the magnetic attraction forces with magnets 60a and 60b. Therefore, the electromagnetic conversion efficiency can be improved as compared to the VCM types of the related art having a large magnetic resistance.

According to vibration actuator 10, in case 21, assembly is possible without interference even when the clearance with movable body 30 is reduced. The trajectory of movable body 30 also becomes stable, and hence designing becomes easier and stable driving of movable body 30 becomes possible. When coil springs are used as metal springs 40, shaft part 80 passes through the center of each of the coil springs, and hence improvement in the ease of assembly and stable spring holding become possible.

Bearing parts 82a and 82b are made of a sintered material, and hence have a higher specific gravity as compared to when a resin material is used for bearing parts 82a and 82b. Therefore, the mass of movable body 30 can be increased, and the output can be increased.

<Effect 8>

The output of vibration actuator 10 depends on the stroke of movable body 30, but the stroke of movable body 30 is difficult to secure when the vibration actuator is driven in the lateral direction due to the design of the vibration actuator.

According to this embodiment, the movable direction of movable body 30 is the longitudinal direction of vibration actuator 10. As a result, the clearance necessary for the stroke can be easily secured, and the output can be increased. Even when metal springs 40 are disposed in the movable direction, the space in which metal springs 40 are disposed can be spread, and the degree of freedom in designing is improved. As a result, the stress of metal springs 40 is easily released, durability is increased, and the lifespan of the metal springs themselves and the product lifespan of vibration actuator 10 can be extended.

Embodiment 2

Figure 11:
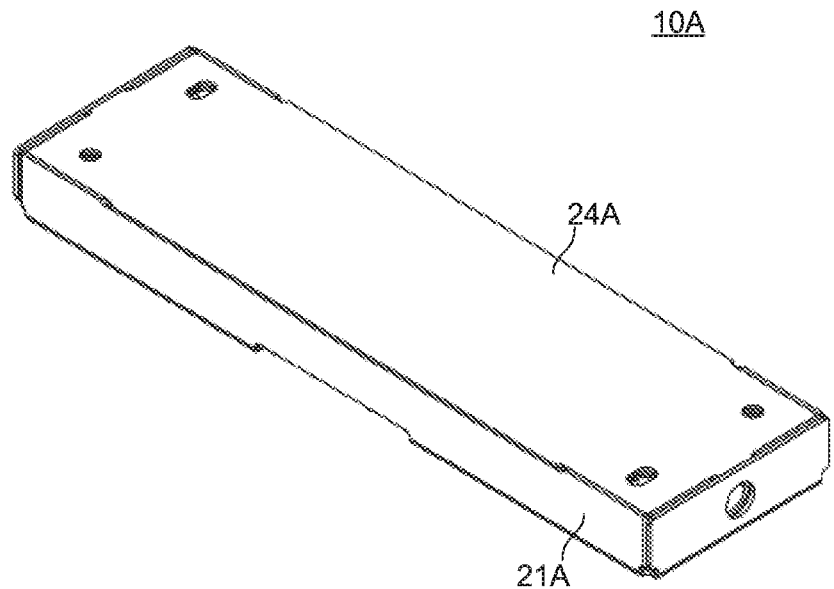
FIG. 11 is an external view illustrating the configuration of a vibration actuator of Embodiment 2 according to the present invention.
Figure 12:
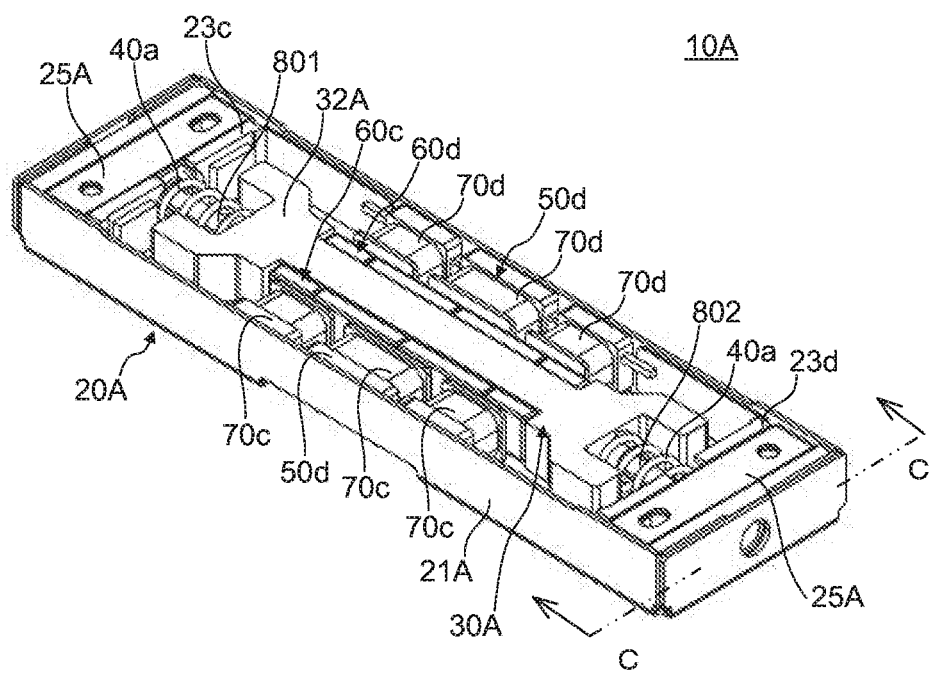
FIG. 12 is a perspective view illustrating the inner configuration of the vibration actuator of Embodiment 2.
Figure 13:
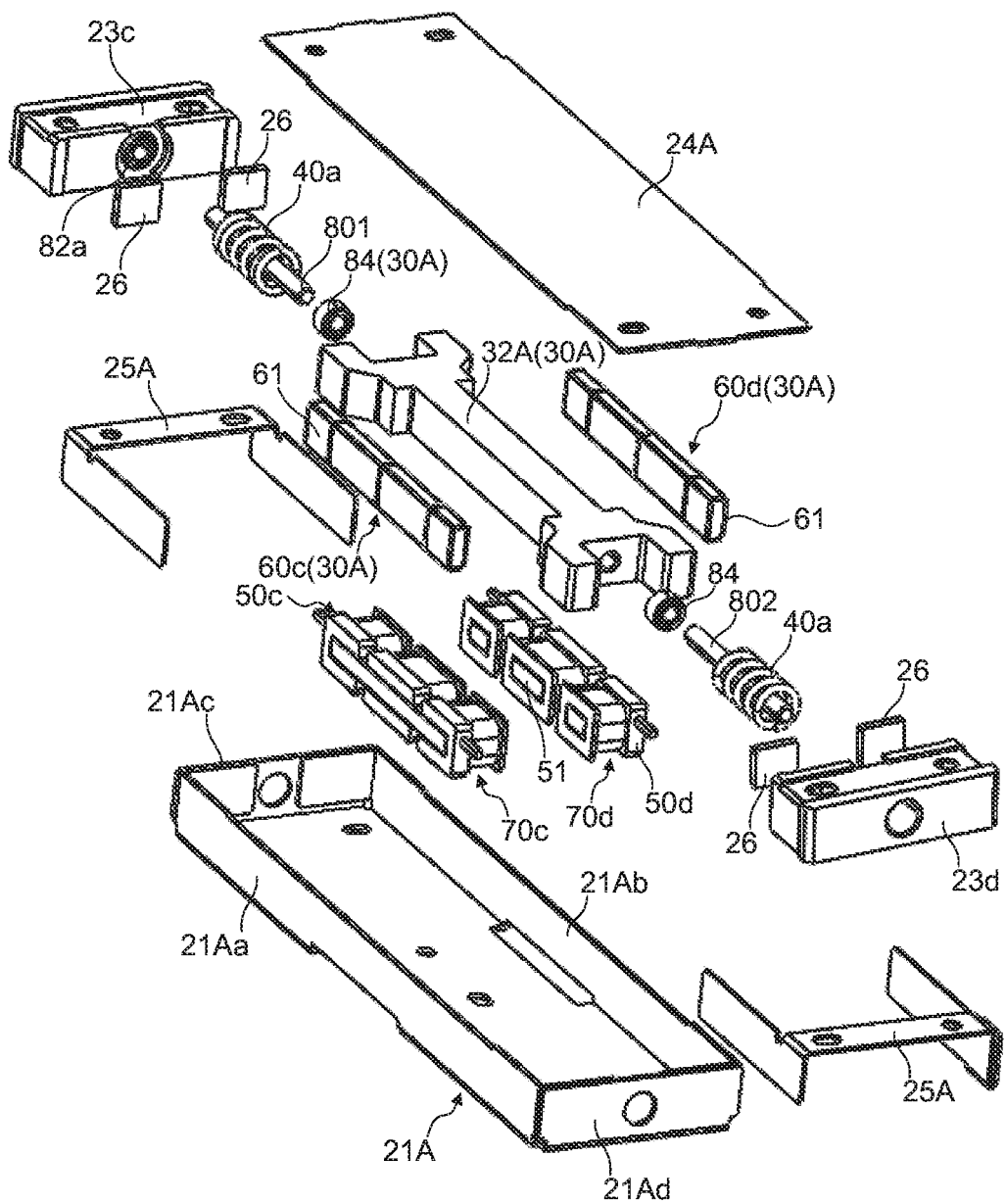
FIG. 13 is an exploded perspective view of the vibration actuator of Embodiment 2 seen from above.
Figure 14:
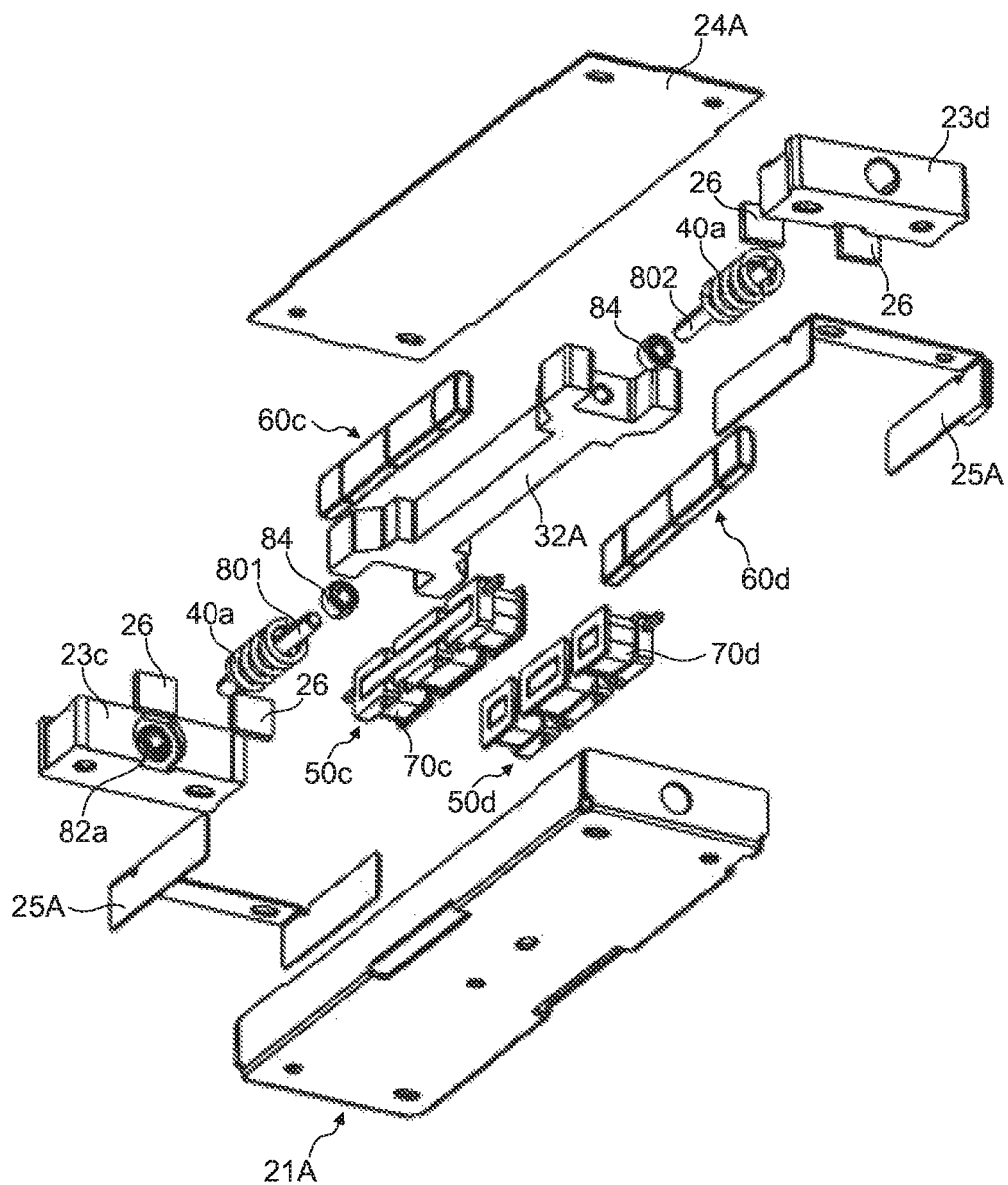
FIG. 14 is an exploded perspective view of the vibration actuator of Embodiment 2 seen from below.
Figure 15:
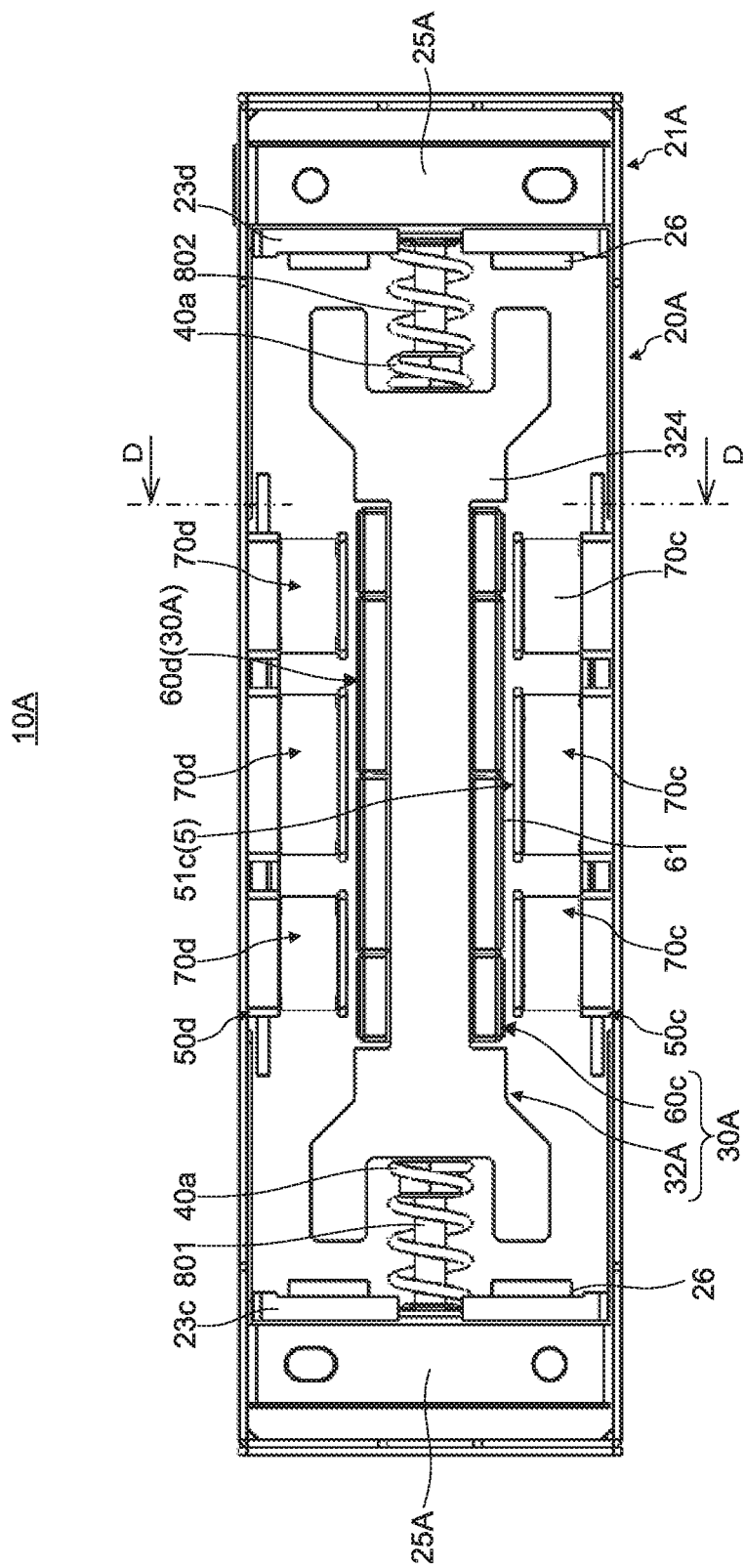
FIG. 15 is a plan view illustrating the inner configuration of the vibration actuator of Embodiment 2.
Figure 16:
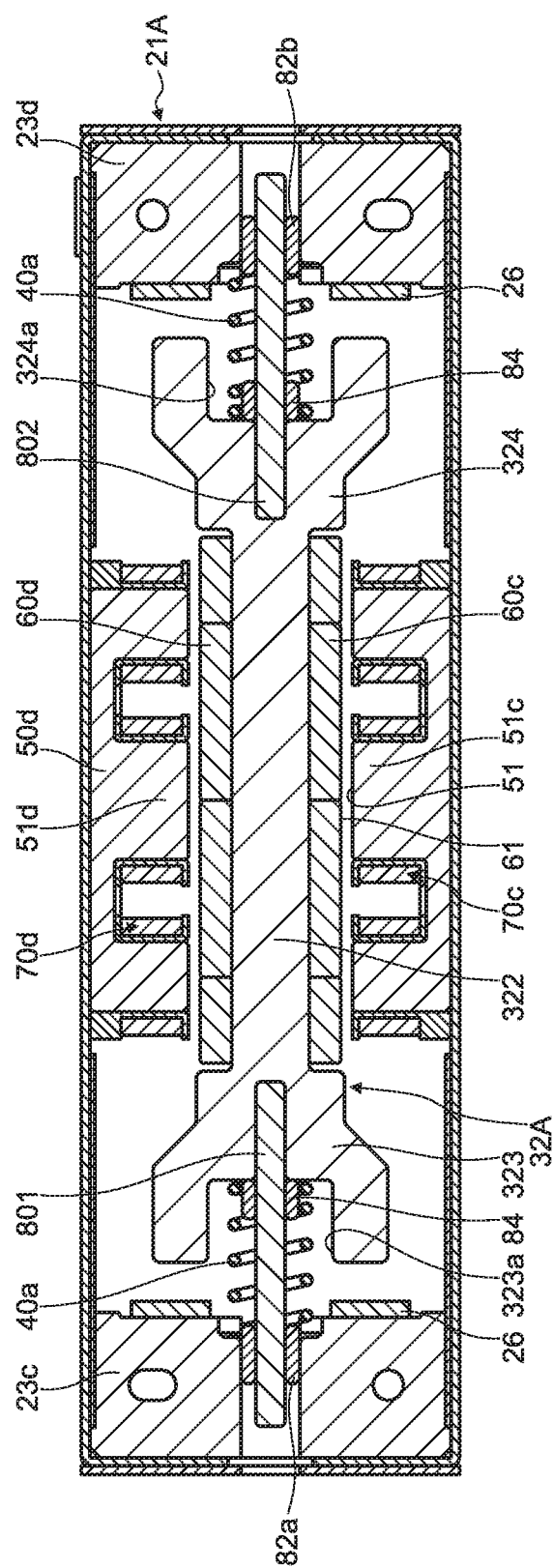
FIG. 16 is an arrow cross-sectional view taken along line C-C in FIG. 12.
Figure 17:
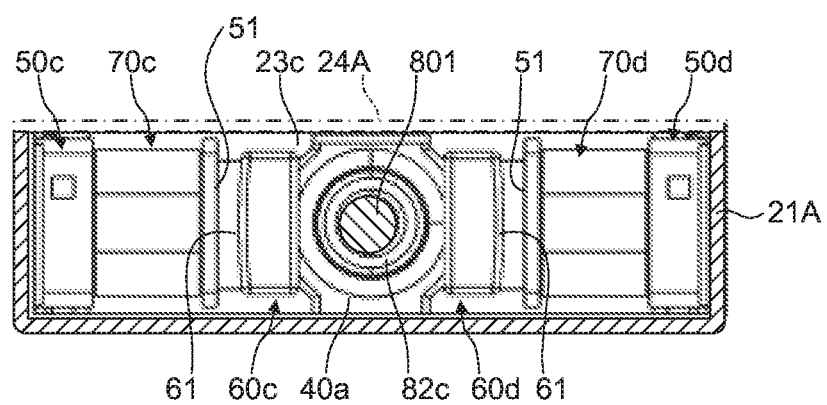
FIG. 17 is an arrow cross-sectional view taken along line D-D in a state in which a movable body main body is removed in FIG. 15.
Figure 18A:
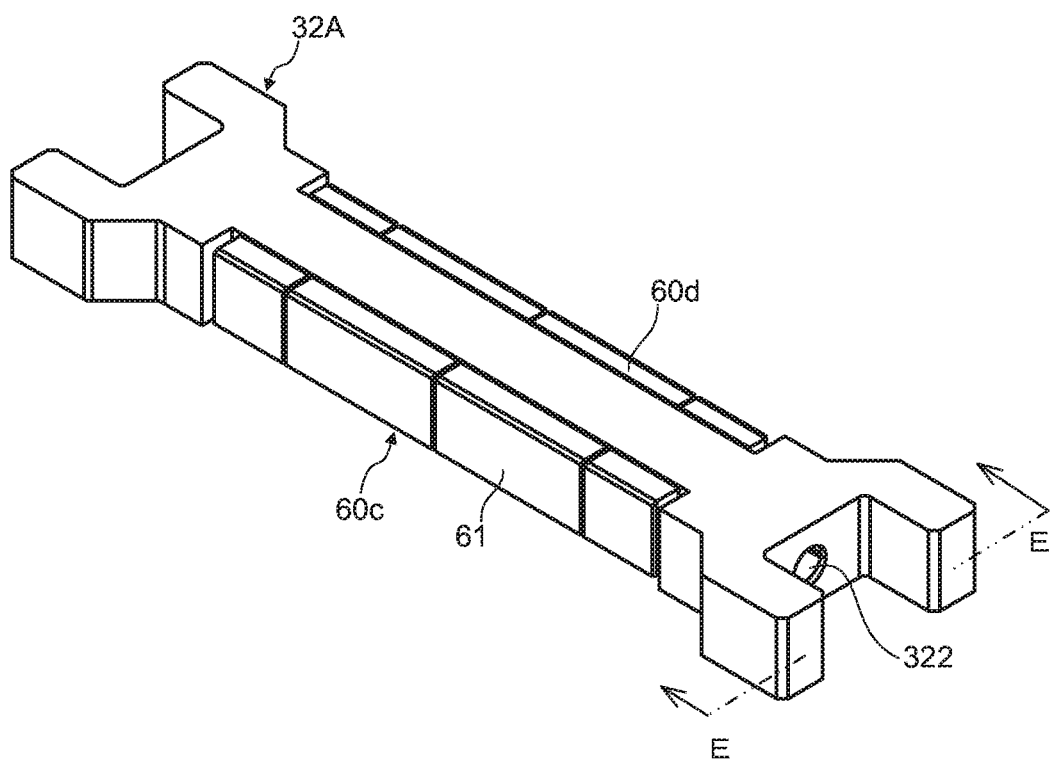
FIG. 18A is a perspective view illustrating a movable body of the vibration actuator of Embodiment 2 according to the present invention.
Figure 18B:
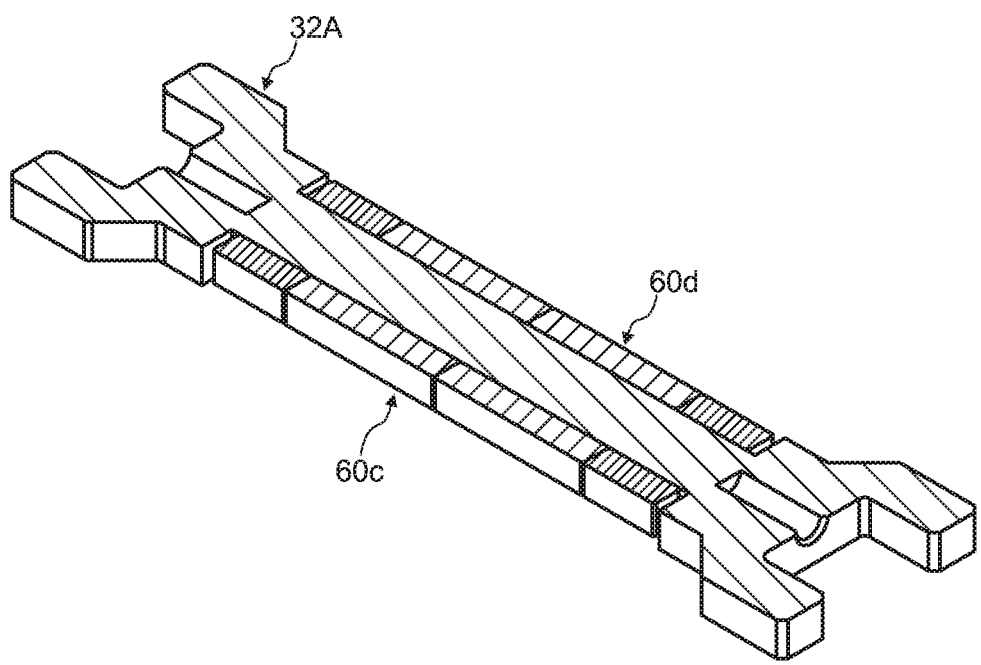
FIG. 18B is an arrow cross-sectional view taken along line E-E in FIG. 18A.
Figure 19:
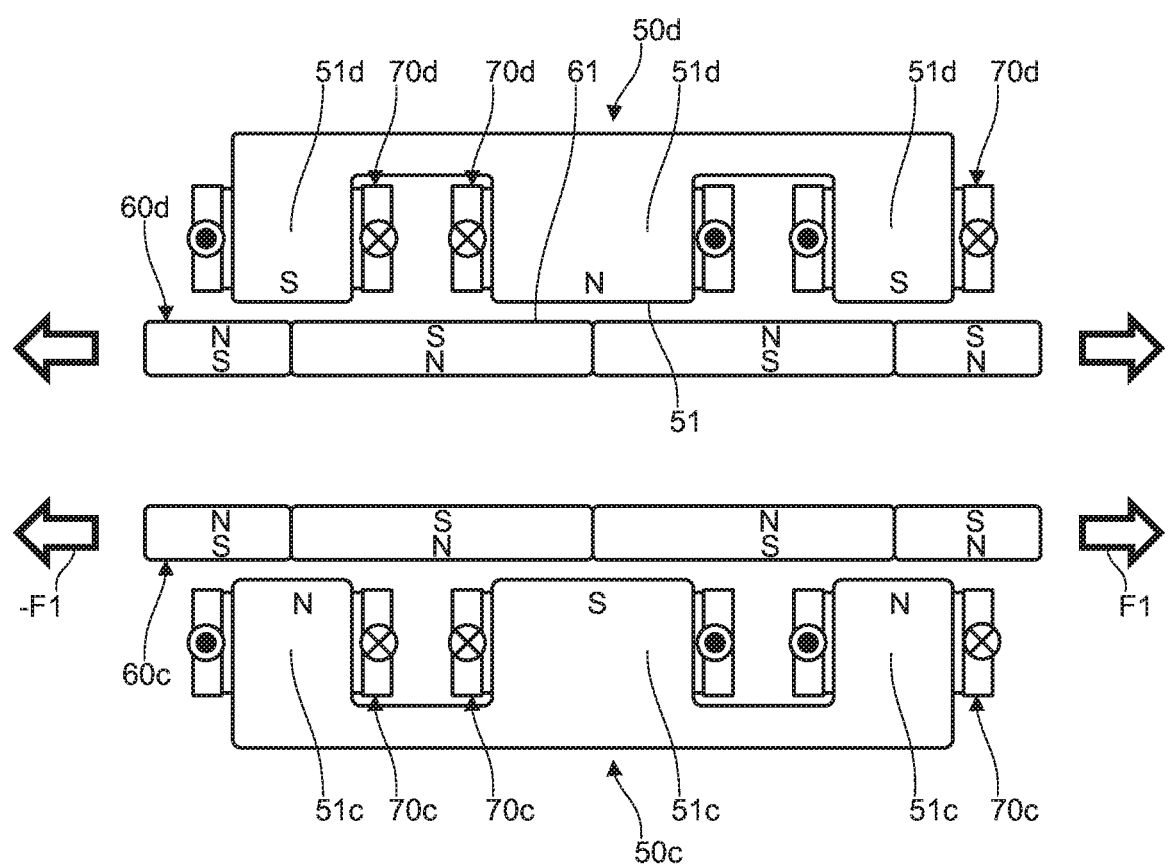
FIG. 19 is a plan view schematically illustrating a magnetic circuit of the vibration actuator.

FIG. 11 is an external view illustrating the configuration of a vibration actuator of Embodiment 2 according to the present invention, and FIG. 12 is a perspective view illustrating the inner configuration of the vibration actuator of Embodiment 2. FIG. 13 is an exploded perspective view of the vibration actuator of Embodiment 2 seen from above, FIG. 14 is an exploded perspective view of the vibration actuator of Embodiment 2 seen from below, and FIG. 15 is a plan view illustrating the inner configuration of the vibration actuator of Embodiment 2. FIG. 16 is an arrow cross-sectional view taken along line C-C in FIG. 12, and FIG. 17 is an arrow cross-sectional view taken along line D-D in a state in which a movable body main body is removed in FIG. 15. FIG. 18A is a perspective view illustrating a movable body of the vibration actuator of Embodiment 2 according to the present invention, FIG. 18B is an arrow cross-sectional view taken along line E-E in FIG. 18A, and FIG. 19 is a plan view schematically illustrating a magnetic circuit of the vibration actuator.

Note that vibration actuator 10A of Embodiment 2 has a basic configuration similar to that of the vibration actuator corresponding to Embodiment 1 described in FIG. 1 to FIG. 10B, but is mainly different in that the number of coils 70c and 70d that are wound around E-shaped cores that are each disposed on one side of movable body 30A is three each, and shaft parts 801 and 802 are provided on movable body 30A sides. The same components as those in vibration actuator 10 are denoted by the same reference characters, and description thereof is omitted.

<Entire Configuration of Vibration Actuator 10A>

Vibration actuator 10A illustrated in FIG. 11 has a flat plate-like shape in which the height (the length in the vertical direction in the accompanying drawings and corresponds to the thickness) is shorter than the width (the crosswise direction in FIG. 11).

As illustrated in FIG. 12, vibration actuator 10A of this embodiment includes fixing body 20A, shaft parts 801 and 802, and movable body 30A movably supported via shaft parts 801 and 802.

Movable body 30A reciprocates, that is, vibrates along the axial direction of shaft parts 801 and 802 in cooperation with magnets 60c and 60d disposed across the shafts of shaft parts 801 and 802, and E-shaped cores (cores) 50c and 50d that are disposed so as to face magnets 60c and 60d with predetermined intervals (air gaps) therebetween and has protruding parts 51c and 51d around which coils 70c and 70d are wound.

Magnets 60c and 60d and E-shaped cores 50c and 50d including coils 70c and 70d are disposed so that magnetic pole surfaces (the magnets correspond to magnetized surfaces) 61 and 51 thereof face each other. Magnets 60c and 60d and E-shaped cores 50c and 50d around which coils 70c and 70d are wound form magnetic force generating parts, and the magnetic force generating parts function as magnetic springs by means of the magnetic attraction forces on both sides of shaft parts 801 and 802. As a result, movable body 30A is elastically supported in a state in which the rotation about the shaft is suppressed and so as to be movable in the axial direction. The magnetic attraction forces are generated so as to be symmetrical about the shafts of shaft parts 801 and 802 across the shafts of shaft parts 801 and 802. Movable body 30A is attracted toward both sides (the directions in opposite directions on a straight line orthogonal to the shaft part) by the magnetic attraction forces generated on both sides of movable body 30A. Therefore, the magnetic attraction forces offset each other, to thereby be balanced. As a result, the rotation of movable body 30A is suppressed and movable body 30A is held in a position in which movable body 30A is in a horizontal state that is a reference position. In this embodiment, as with Embodiment 1, metal springs 40a and 40a that elastically support movable body 30A so that movable body 30A is returnable when movable body 30A moves in the axial direction are included in addition to the magnetic springs.

In vibration actuator 10A of this embodiment, shaft parts 801 and 802 are fixed to movable body 30A so as to protrude to the axial direction from the center of the end parts on the vibration side, and the protruding end-part sides of shaft parts 801 and 802 are movably mounted on fixing body 20A.

Fixing body 20A includes case 21A, bearing holders 23c and 23d that accommodate bearing parts 82a and 82b, coils 70c and 70d, E-shaped cores 50c and 50d each having slits on one surface of a rectangular shape and having coils 70c and 70d disposed in the slits, and power supply section 25A. In fixing body 20A, an opening part opened upward in case 21A of fixing body 20A is covered with cover 24A.

Meanwhile, movable body 30A includes pair of magnets 60c and 60d in which a plurality of magnetic poles (four poles in this embodiment) are alternately disposed in the longitudinal direction, and movable body main body 32A to which magnets 60c and 60d and spring receiving parts 84 and 84 are fixed. Movable body 30A is elastically supported by metal springs 40a. Metal springs 40a are cylindrical coil springs, for example, through which shaft parts 801 and 802 are inserted, and are interposed between movable body 30A and each of bearing holders 23c and 23d (in detail, bearing parts 82a and 82b). On movable body 30A sides, metal springs 40a are received by spring receiving parts 84 disposed in the centers of the end parts (front and rear projecting parts 323 and 324 illustrated in FIG. 16) of movable body 30A that are separated from each other in the vibration direction.

In vibration actuator 10A, movable body 30A (magnets 60c and 60d, and movable body main body 32A) is elastically supported by the biasing forces of metal springs 40a and 40a in the axial direction, and the magnetic springs by means of the magnetic attraction forces generated by magnets 60c and 60d and E-shaped cores 50c and 50d around which coils 70c and 70d are wound.

<Fixing Body 20A of Vibration Actuator 10A>

As with case 21, case 21A is formed in a rectangular box shape having a bottom surface part, and E-shaped cores 50c and 50d are disposed on both side walls along the longitudinal direction so as to face each other. In case 21A, bearing holders 23c and 23d that accommodate bearing parts 82a and 82b are disposed so as to face each other and so that bearing parts 82a and 82b thereof face each other along both end walls 21Ac and 21Ad that close both end parts of each of both side walls 21Aa and 21Ab.

Bearing holders 23c and 23d are disposed so as to face each other across movable body 30A over predetermined intervals in the vibration direction in case 21A. Note that shaft parts 801 and 802 are slidably inserted through bearing parts 82a and 82b, and bearing parts 82a and 82b are formed from sintered sleeve bearings, for example.

Bearing holders 23c and 23d position bearing parts 82a and 82b in the central part of case 21A in the transverse direction, that is, end walls 21Ac and 21Ad in the width direction. By inserting the protruding end parts of shaft parts 801 and 802 fixed to movable body 30A into bearing parts 82a and 82b, shaft parts 801 and 802 are fixed on the sides of both end walls 21c and 21d of case 21A via bearing holders 23c and 23d.

On the surfaces of bearing holders 23c and 23d that face each other, buffer parts 26 against which reciprocating movable body 30A abuts are provided in areas that sandwich bearing parts 82a and 82b therebetween.

Buffer parts 26 alleviate the impact of abutting movable body 30A, and transmit the impact to case 21A. As a result, the vibration caused by driving of movable body 30A can be transmitted to entire vibration actuator 10A via case 21A, and the vibration felt by the user holding a mobile terminal, a wearable terminal, or an incoming device when vibration actuator 10A is mounted on the mobile terminal, the wearable terminal, or the incoming device can be increased. When impact is generated due to falling, buffer parts 26 also function as a damper that reduces damage.

Note that case 21A forms a hollow electromagnetic shield by being mounted on cover 24A.

E-shaped cores 50c and 50d are magnetic bodies in this embodiment, and are formed in same shapes that are symmetrical about the shaft of shaft part 80. E-shaped cores 50c and 50d are disposed so as to face each other across movable body 30A in case 21A. E-shaped cores 50c and 50d include plurality of protruding parts (magnetic poles) 51c and 51d whose distal end surfaces serve as magnetic pole surfaces 51. Plurality of protruding parts 51c and 51d in E-shaped cores 50c and 50d are disposed so as to be lined up on one side surface in the extending direction of one side surface. Note that magnetic pole surfaces 51 are disposed so as to be parallel to shaft parts 801 and 802 and both side walls 21Aa and 21Ab (see FIG. 13) of case 21A, and parallel to magnetic pole surfaces 61 of magnets 60c and 60d.

E-shaped cores 50c and 50d are formed in E-shapes in planar view. In detail, E-shaped cores 50c and 50d have E-shapes in planar view each having slits formed in one side of a rectangular parallelepiped along the longitudinal direction so as to divide the side into three in the longitudinal direction, and having protruding parts 51c and 51d on one surface sides. In E-shaped cores 50c and 50d, coils 70c and 70d pass through the slits, and coils 70c and 70d are disposed so as to be wound around protruding parts 51c and 51d. When coils 70c and 70d are excited by carrying electric current, protruding parts 51a on both sides located across the center protruding parts are excited in a polarity opposite to that of center protruding part 51c, 51d in E-shaped cores 50c and 50d. Note that, for E-shaped cores 50c and 50d, the magnetic pole surfaces of protruding parts 51c and 51d that face each other are preferred to be excited in different polarities. As a result, the magnetic circuit configuration in vibration actuator 10A becomes efficient.

Coils 70c and 70d are wound around all protruding parts 51c and 51d in E-shaped cores 50c and 50d, and are connected to power supply section 25A. Coils 70c and 70d are disposed so as to surround the distal end surfaces of protruding parts 51c and 51d forming surfaces for each of the magnetic poles in magnetic pole surfaces 51 facing magnetic pole surfaces 61 of magnets 60*c* and 60*d*. Coils 70*c* and 70*d* excite protruding parts 51*c* and 51*d* by being supplied with electric power from power supply section 25A, and the polarities of other protruding parts 51*c* and 51*d* located across center protruding parts 51*c* and 51*d* have the same polarity in E-shaped cores 50*c* and 50*d*.

Power supply section 25A is a board that supplies electric power to coils 70*c* and 70*d*, and is formed from a board, for example, a flexible circuit board (FPC: Flexible printed circuits) and the like connected to an external power supply. Power supply section 25A is disposed on sides of both end walls of case 21A, disposed on bearing holders 23*c* and 23*d*, and is connected to coils 70*c* and 70*d* in case 21A.

<Movable Body 30A of Vibration Actuator 10A>

As illustrated in FIG. 12 and FIG. 15, movable body 30A is disposed so as to be movable in the extending direction of shaft parts 801 and 802 in case 21A in fixing body 20A. Movable body 30A includes movable body main body 32A, magnets 60*c* and 60*d*, and spring receiving parts 84. Note that shaft parts 801 and 802 are fixed to movable body main body 32A along the axial center of movable body main body 32A.

Movable body main body 32A may be made of, for example, a sintered material, a metal injection molding (MIM) material, or an SECC, or may be made of high specific-gravity materials whose specific gravity is higher than the materials such as the SECC. Movable body main body 32A is made of high specific-gravity materials such as tungsten or tungsten alloy, for example. In this embodiment, movable body main body 32A is molded in tungsten.

Movable body main body 32A is formed in an I-shape in planar view whose central parts of both side surfaces of a rectangular parallelepiped extending along the longitudinal direction of case 21A are cut off.

In other words, as illustrated in FIG. 16, movable body main body 32A forms an I-shape with body 322 of the rectangular shape, and front projecting part 323 and rear projecting part 324 projecting to both sides on both ends of body 322 in the longitudinal direction (corresponding to the vibration direction). Magnets 60*c* and 60*d* are disposed on both side surfaces (both side surfaces along the axial direction) of body 322 of movable body main body 32A along the axial direction.

Recessed-shaped spot facing parts 323*a* and 324*a* (see FIG. 16) opened to the vibration direction are formed in end surfaces of front projecting part 323 and rear projecting part 324. One end part of each of shaft parts 801 and 802 is press fitted or fixed by bonding and the like in spot facing parts 323*a* and 324*a*.

Shaft parts 801 and 802 are provided in front projecting part 323 and rear projecting part 324 so as to protrude from spot facing parts 323*a* and 324*a* and be positioned on the center line of movable body 30A in the vibration direction. Shaft parts 801 and 802 are disposed in the center of case 21A in the width direction, and are inserted through spring receiving parts 84 in spot facing parts 323*a* and 324*a*.

Metal springs 40*a* and 40*a* are provided on the outer periphery of shaft parts 801 and 802. Metal springs 40*a* and 40*a* are inserted between the bottom surfaces of spot facing parts 323*a* and 324*a* and bearing holders 23*c* and 23*d* in which protruding end parts of shaft parts 801 and 802 are inserted. Metal springs 40*a* and 40*a* are disposed across movable body 30A in the longitudinal direction that is the vibration direction. Movable body 30A is biased to be positioned in the center position (the driving reference position described below) in the longitudinal direction.

Movable body main body 32A is elastically supported via metal springs 40*a* and 40*a*. Therefore, even when coils 70*c* and 70*d* are not supplied with electric power, movable body 30A is positioned in the driving reference position in case 21A (fixing body 20A) by metal springs 40 in addition to the function of the magnetic springs.

Shaft parts 801 and 802 are provided so as to protrude from the front and rear projecting parts of movable body main body 32A, that is, both end parts on the vibration direction sides of movable body main body 32A, and are inserted in bearing parts 82*a* and 82*b* of bearing holders 23*c* and 23*d* on fixing body 20A side so as to be movable in the axial direction. As a result, shaft parts 801 and 802 can vibrate in the axial direction together with movable body main body 32A.

Magnets 60*c* and 60*d* include magnetic pole surfaces 61 serving as a plurality of magnetic poles, and are disposed so that magnetic pole surfaces 61 face the opposite sides and the shafts of shaft parts 801 and 802 are located therebetween. In this embodiment, magnets 60*c* and 60*d* are fixed on both side surfaces of movable body main body 32A through which shaft parts 801 and 802 are inserted along the longitudinal direction so as to be parallel to the shafts of shaft parts 801 and 802 and so that magnetic pole surfaces 61 face both sides. Only the magnetized directions of magnets 60*c* and 60*d* are different, and magnets 60*c* and 60*d* are formed in the same shape. In this embodiment, as illustrated in FIGS. 12 to 16 and FIG. 19, four different magnetic poles are alternately disposed on magnetic pole surfaces 61. In this embodiment, different magnetic poles are disposed so as to be positioned in opposite directions in a direction orthogonal to the shafts of shaft parts 801 and 802 (see FIG. 19). Magnets 60*c* and 60*d* are disposed so as to face the magnetic pole surfaces of E-shaped cores 50*c* and 50*d*, and line up with alternately different polarities in the longitudinal direction (axial center direction) of case 21A. Note that magnets 60*c* and 60*d* may be formed from alternately lining up different magnets (magnet pieces) with a plurality of magnetic poles, or may be magnetized so as to have alternately different magnetic properties.

Magnetic pole surfaces 61 are disposed so as to face magnetic pole surfaces 51 of E-shaped cores 50*c* and 50*d* over predetermined intervals (air gaps) and be parallel to magnetic pole surfaces 51.

As illustrated in FIG. 17, magnetic pole surfaces 61 of magnets 60*c* and 60*d* are each formed in a center-protruding shape that is a trapezoidal shape or a curved surface in which the center part in the height direction is the closest to facing magnetic pole surface 51. In this embodiment, magnetic pole surfaces 61 are each formed as a curved surface in which the center part in the height direction is the closest to magnetic pole surface 51. As a result, the force (torque) that stops movable body 30A with respect to the rotation direction acts on movable body 30A so as to stop movable body 30A in the center in the rotation direction. As a result, movable body 30A can be placed in a state in which movable body 30A is disposed so as to be substantially horizontal and stable, the contact of movable body 30A with fixing body 20A, that is, interference among parts can be prevented, and stable driving can be realized. Note that, when movable body 30A rotates, it becomes difficult for magnets 60*c* and 60*d* to come into contact with magnetic pole surfaces 51 of E-shaped cores 50*c* and 50*d*.

In this embodiment, the areas of magnetic pole surfaces 61 and magnetic pole surfaces 51 that face each other in the limited space in case 21A are increased as much as possible, and the magnetic flux is efficiently concentrated and the output is increased when the magnetic circuit is driven.

In this embodiment, as with Embodiment 1, in case 21A, E-shaped cores 50c and 50d that are magnetic bodies are disposed so as to face magnets 60c and 60d that are disposed across the shafts of shaft parts 801 and 802. As a result, magnetic attraction forces are generated between E-shaped cores 50c and 50d and magnets 60c and 60d. The generated magnetic attraction forces are generated on the same straight line across the shafts of shaft parts 801 and 802 and in opposite directions in separating directions, and hence offset each other. By those magnetic attraction forces, the inclination of movable body 30A that pivots around shaft parts 801 and 802 is removed, movable body 30A is placed in a positioned state (the positioning of the movable body), and the rotation about shaft parts 801 and 802 is restricted (so-called rotation stop). Magnetic pole surfaces 61 of magnets 60c and 60d are formed in center-protruding shapes in which the center parts in the height direction or the rotation direction are the closest to magnetic pole surfaces 51 of E-shaped cores 50c and 50d. As a result, movable body 30A including magnets 60c and 60d is disposed in a position in which movable body 30A is not inclined and pivots around shaft parts 801 and 802 without being attracted to one side of E-shaped cores 50c and 50d located across movable body 30A, that is, is disposed in a substantially horizontal and stable state. Note that, in this embodiment, movable body 30A is elastically supported by the magnetic attraction forces that are so-called magnetic springs between E-shaped cores 50c and 50d and magnets 60c and 60d, and metal springs 40 (mechanical springs) that sandwich movable body 30A therebetween in the axial direction. Note that it is possible to elastically support movable body 30A by only the magnetic attraction forces that are so-called magnetic springs between E-shaped cores 50c and 50d and magnets 60c and 60d.

E-shaped cores 50c and 50d are excited when coils 70c and 70d are supplied with power supply from power supply section 25A, the distal end surfaces of protruding parts 51c and 51d are magnetized, to thereby have magnetic poles, and thrust is generated in accordance with the relationship between the magnetic poles of magnets 60c and 60d disposed so as to face each other.

In this embodiment, for example, as illustrated in FIG. 19, as with Embodiment 1, the polarities (magnetic pole surfaces 61) of magnet 60c facing E-shaped core 50c side are disposed in the order of an S pole, an N pole, an S pole, and an N pole from the front side to the rear side, and are disposed so as to be lined up in the longitudinal direction while facing magnetic pole surface 51 of E-shaped core 50c. Meanwhile, the polarities (magnetic pole surfaces 61) of magnet 60d facing E-shaped core 50d side are disposed in the order of an N pole, an S pole, an N pole, and an S pole from the front side to the rear side, and are disposed so as to be lined up in the longitudinal direction while facing magnetic pole surface 51 of E-shaped core 50d. In other words, in this embodiment, as with Embodiment 1, the number of polarities facing each other in magnets 60c and 60d and E-shaped cores 50c and 50d is 4 for the magnet: 3 for the E-shaped core.

Electric current is supplied to coils 70c and 70d. By the supplying of the electric current, as illustrated in FIG. 19, E-shaped cores 50c and 50d are excited, thereby causing the polarity of center protruding part 51c of E-shaped core 50c facing magnet 60c to be an S pole and causing protruding parts 51c on both sides located across center protruding part 51c to be N poles. At the same time, the polarity of center protruding part 51d of E-shaped core 50d facing magnet 60d is caused to be an N pole, and protruding parts 51d on both sides located across center protruding part 51d are caused to be S poles. As a result, the polarities of protruding parts 51c and 51d located across center protruding parts 51c and 51d of E-shaped cores 50c and 50d are polarities that are different from the polarities of center protruding parts 51c and 51d (see FIG. 19). As a result, by the magnetic attraction force, thrust is generated in direction F1, and cores 50c and 50d are driven in direction F1. By supplying electric current to coils 70c and 70d in the opposite direction, the polarities of E-shaped cores 50c and 50d are caused to be opposite. In other words, the polarity of center protruding part 51c of E-shaped core 50c facing magnet 60c is caused to be an N pole, protruding parts 51c on both sides of center protruding part 51c are caused to be S poles, the polarity of center protruding part 51d of E-shaped core 50d facing magnet 60d is caused to be an S pole, and protruding parts 51d on both sides of center protruding part 51d are caused to be N poles. As a result, movable body 30A including magnets 60c and 60d that face the above are driven in direction −F1 that is directly opposite to direction F1.

In other words, in vibration actuator 10A, by the alternating waveform input to coils 70c and 70d from power supply section 25A, E-shaped cores 50c and 50d, that is, facing surfaces 51 of E-shaped cores 50c and 50d (in detail, the distal end surfaces of protruding parts 51c and 51d) are magnetized, and the magnetic attraction force and the repulsive force are effectively generated for magnets 60c and 60d on movable body 30A sides. As a result, magnets 60c and 60d of movable body 30A reciprocate in both directions F (direction F1 and direction −F1) along the longitudinal direction with reference to the position serving as the driving reference position (here, the position in which the center of magnet 60c in the longitudinal direction (axial direction) and the center of facing surface 51 overlap each other, and the center of magnet 60c in the height direction and the center of facing surface 51 in the height direction overlap each other in planar view). In other words, movable body 30A vibrates in a reciprocating manner with respect to fixing body 20A in a direction (corresponding to the axial direction) along magnetic pole surfaces 61 and 51 of magnets 60c and 60d and E-shaped cores 50c and 50d. Note that the driving principle is an operating principle similar to that of vibration actuator 10 in Embodiment 1 realized by expressions 1, 2, and 3 described above. In vibration actuator 10A, as with Embodiment 1, movable body 30A including magnets 60c and 60d reciprocates (vibrates in a reciprocating manner) in the longitudinal direction that is the axial direction, that is, the vibration direction by changing the direction of the electric current to be supplied to coils 70c and 70d.

According to vibration actuator 10A, the following effects can be exhibited in addition to effects similar to <Effect 1>, <Effect 2>, and <Effect 4> to <Effect 8> described above.

In vibration actuator 10A of this embodiment, on both sides of movable body main body 32A of movable body 30A, three coils 70c and three coils 70d for excitation are wound around E-shaped cores 50c and 50d that are disposed across the shafts of shaft parts 801 and 802.

As a result, in case 21A, on both sides of movable body 30A, the spaces for the coils that excite E-shaped cores 50c and 50d can be dispersed. Therefore, the degree of freedom in designing the coils increases, the vibration output can be increased, and actuator 10A itself can be thinner.

In vibration actuator 10A, shaft parts 801 and 802 that support movable body 30A with respect to fixing body 20A are fixed so as to protrude to the vibration direction from the end parts of movable body 30A that are separated from each other in the vibration direction, and movable body 30A is supported so as to be movable in the axial direction with respect to fixing body 20A.

As a result, as compared to the configuration in which the shaft part that supports movable body 30A is fixed to the fixing body side and is passed through the movable body, a through hole does not necessarily need to be formed in the movable body main body, and the weight of movable body 30A can be accordingly increased, thereby enabling the vibration output to be increased. A through hole through which the shaft part is inserted does not necessarily need to be formed in movable body 30A (specifically, movable body main body 32A), and hence manufacturability can be improved.

In Embodiments 1 and 2, the number of polarities facing each other is 4 for the magnet: 3 for the core. Note that the ratio of the number of poles may be magnet:core=2:3 or 3:2.

Embodiment 3

Figure 20:
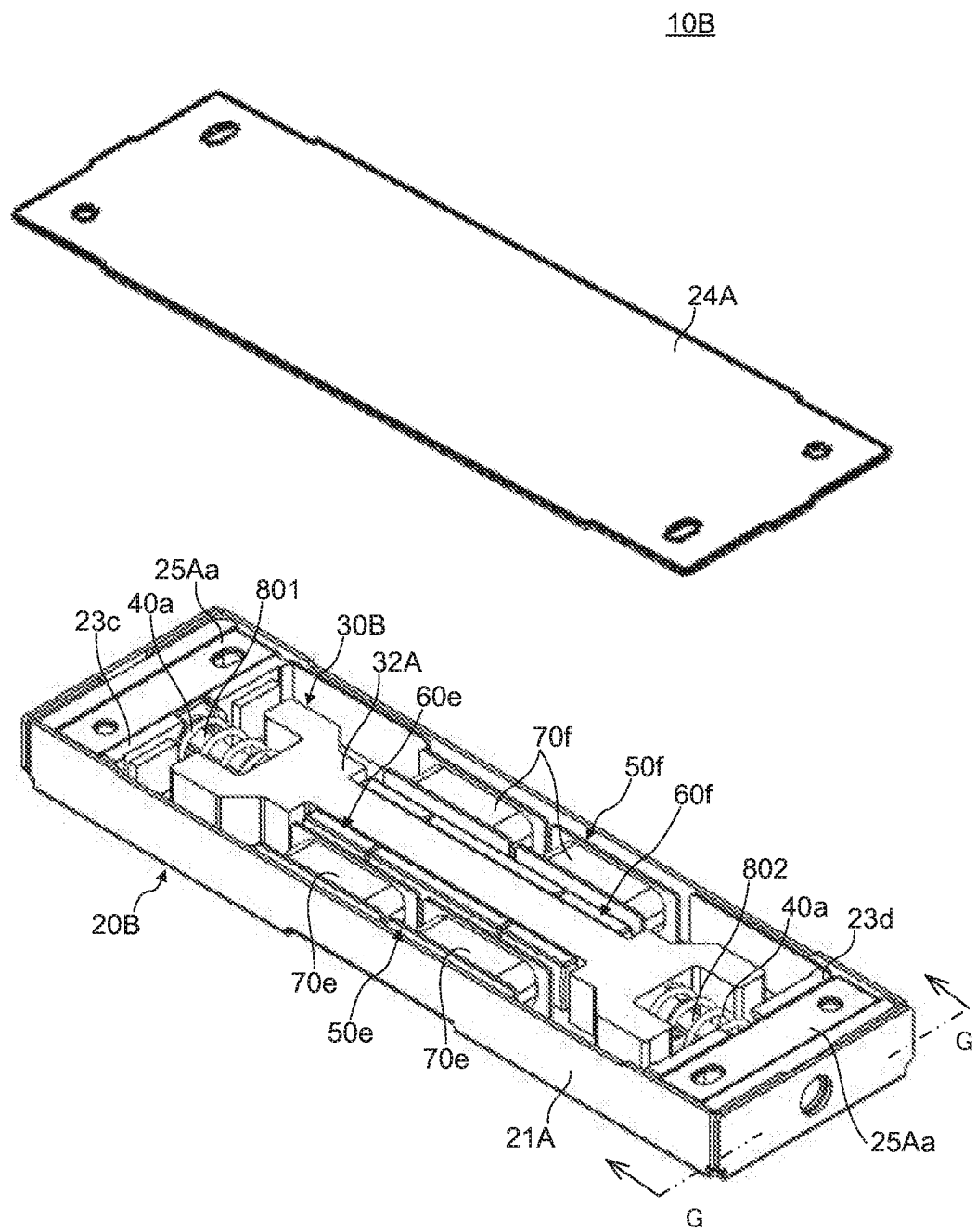
FIG. 20 is an external view illustrating the configuration of a vibration actuator of Embodiment 3 according to the present invention.
Figure 21:
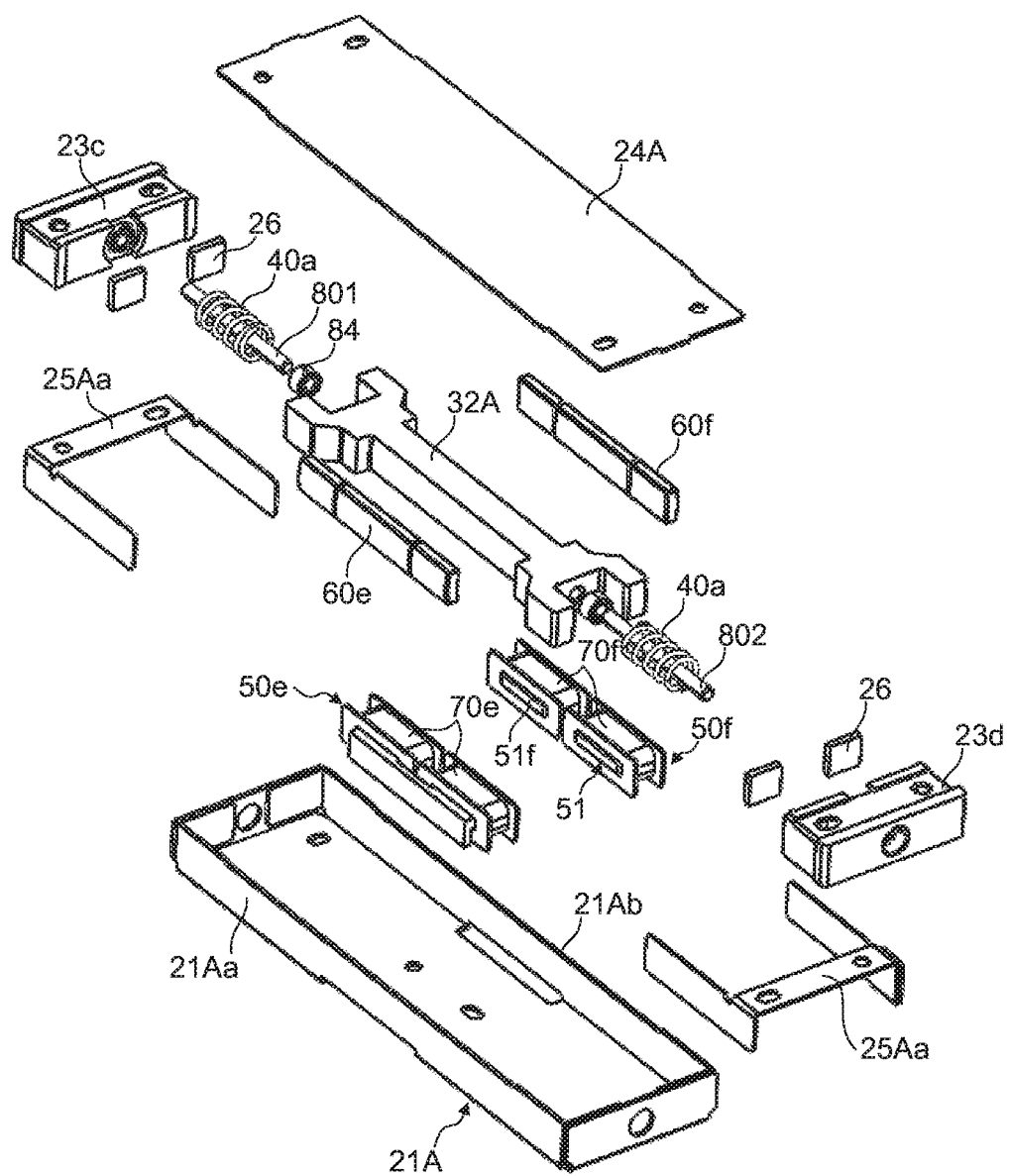
FIG. 21 is an exploded perspective view of the vibration actuator of Embodiment 3.
Figure 22:
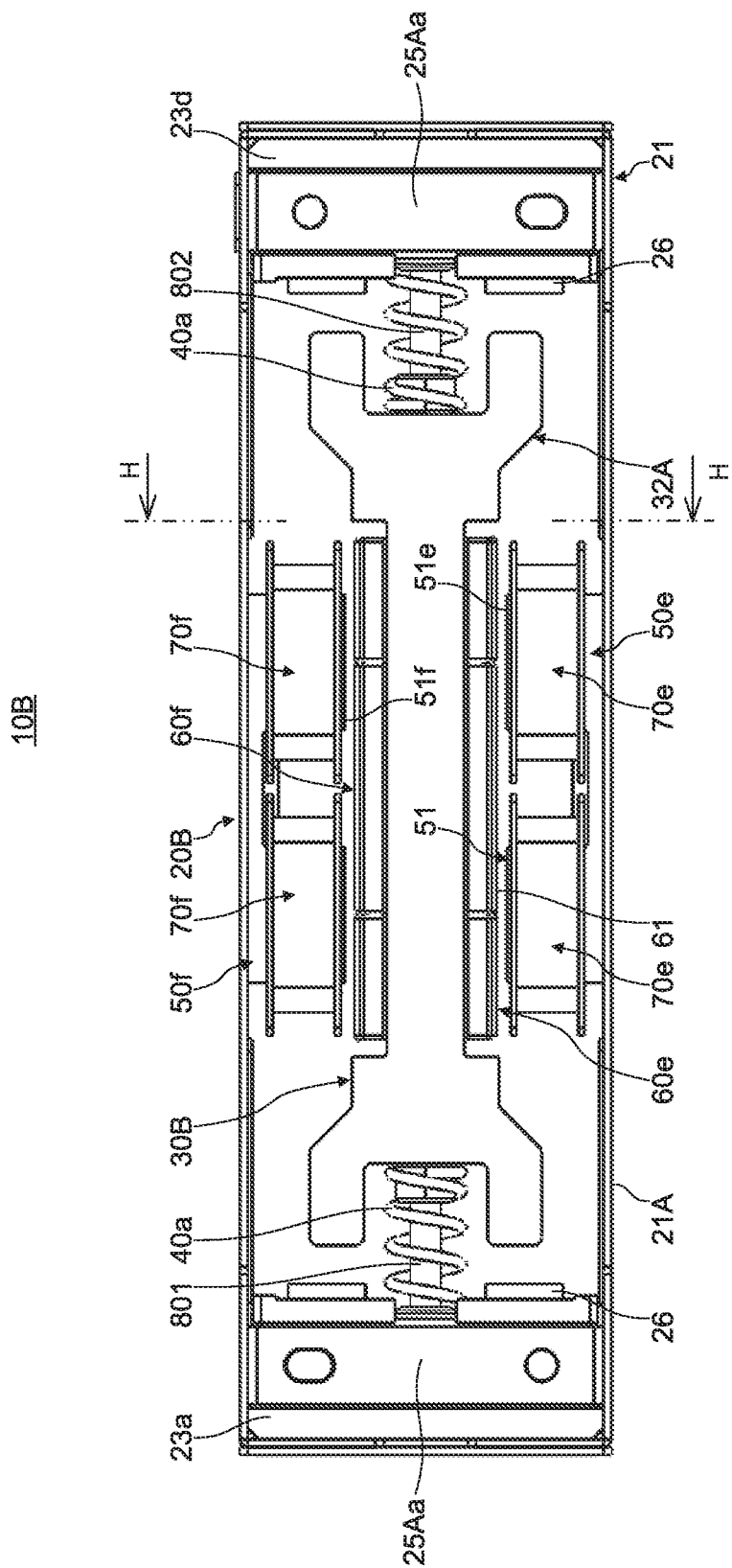
FIG. 22 is a plan view illustrating the inner configuration of the vibration actuator of Embodiment 3.
Figure 23:
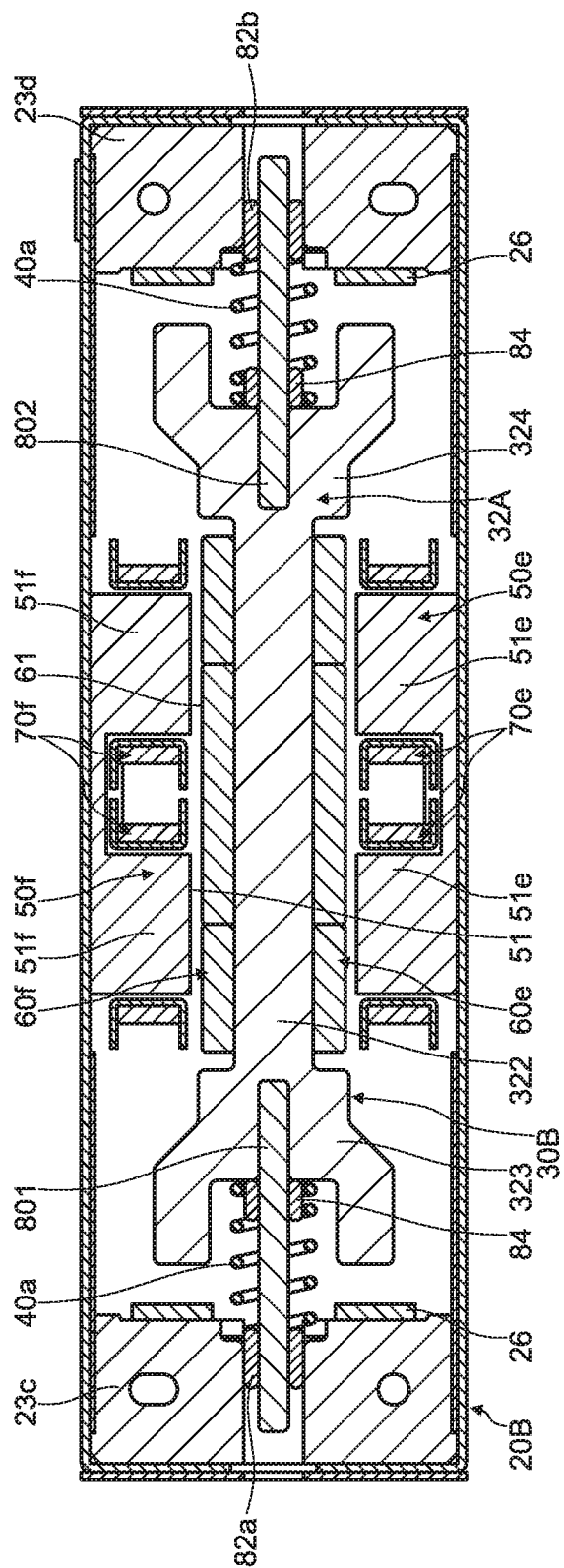
FIG. 23 is an arrow cross-sectional view taken along line G-G in FIG. 20.
Figure 24:
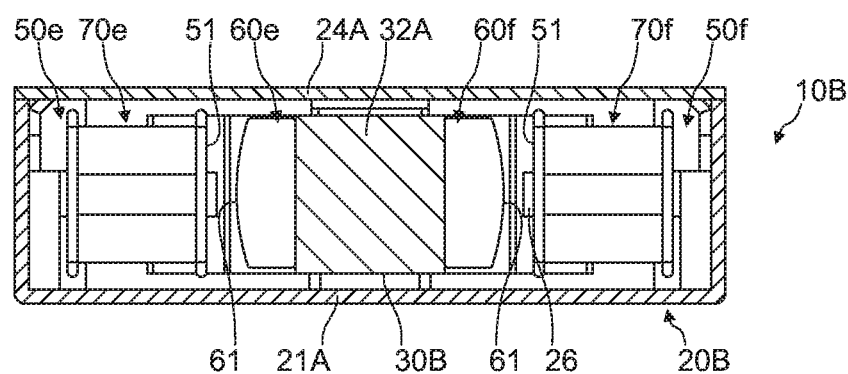
FIG. 24 is a cross-sectional view taken along line H-H in FIG. 22.
Figure 25A:
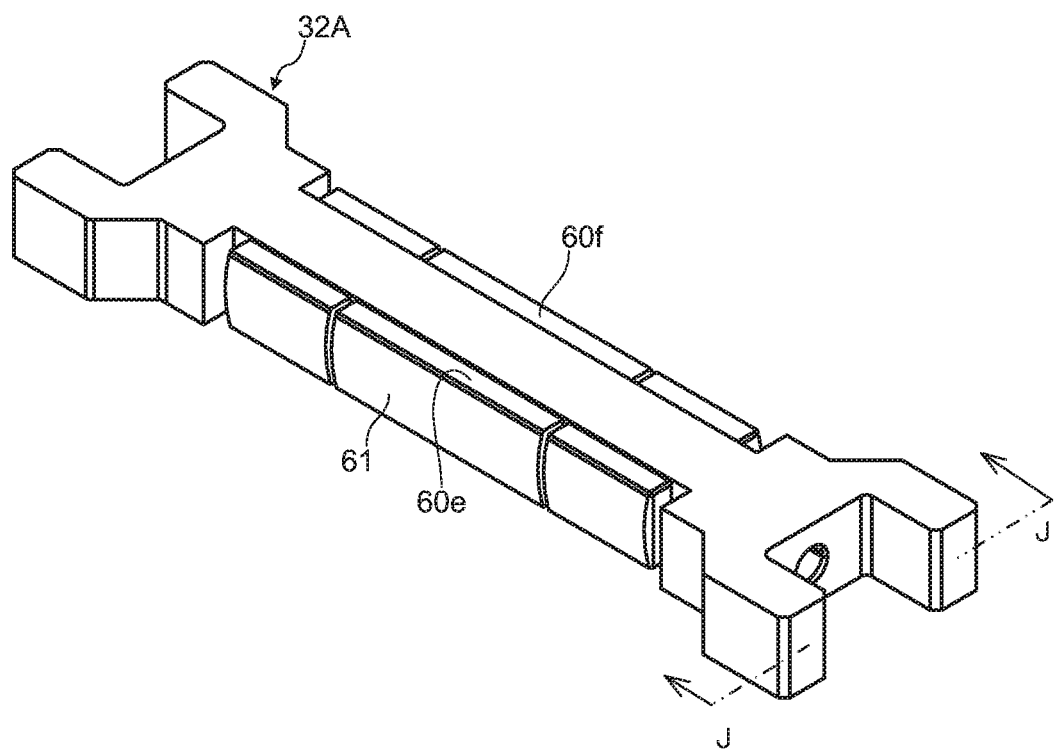
FIG. 25A is a perspective view illustrating a movable body of the vibration actuator of Embodiment 3 according to the present invention.
Figure 25B:
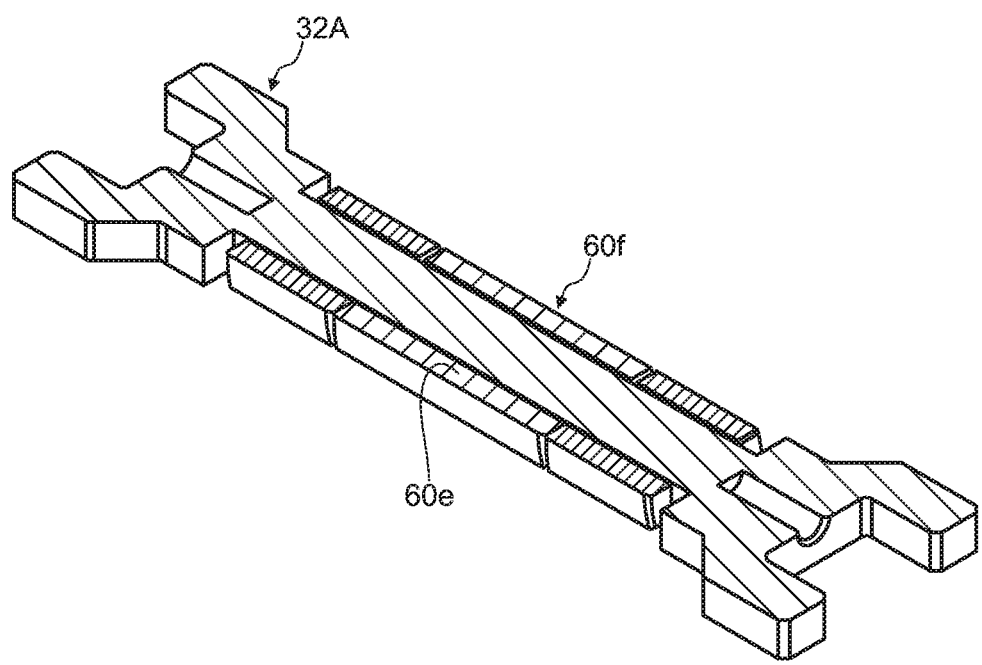
FIG. 25B is an arrow cross-sectional view taken along line J-J in FIG. 25A.
Figure 26:
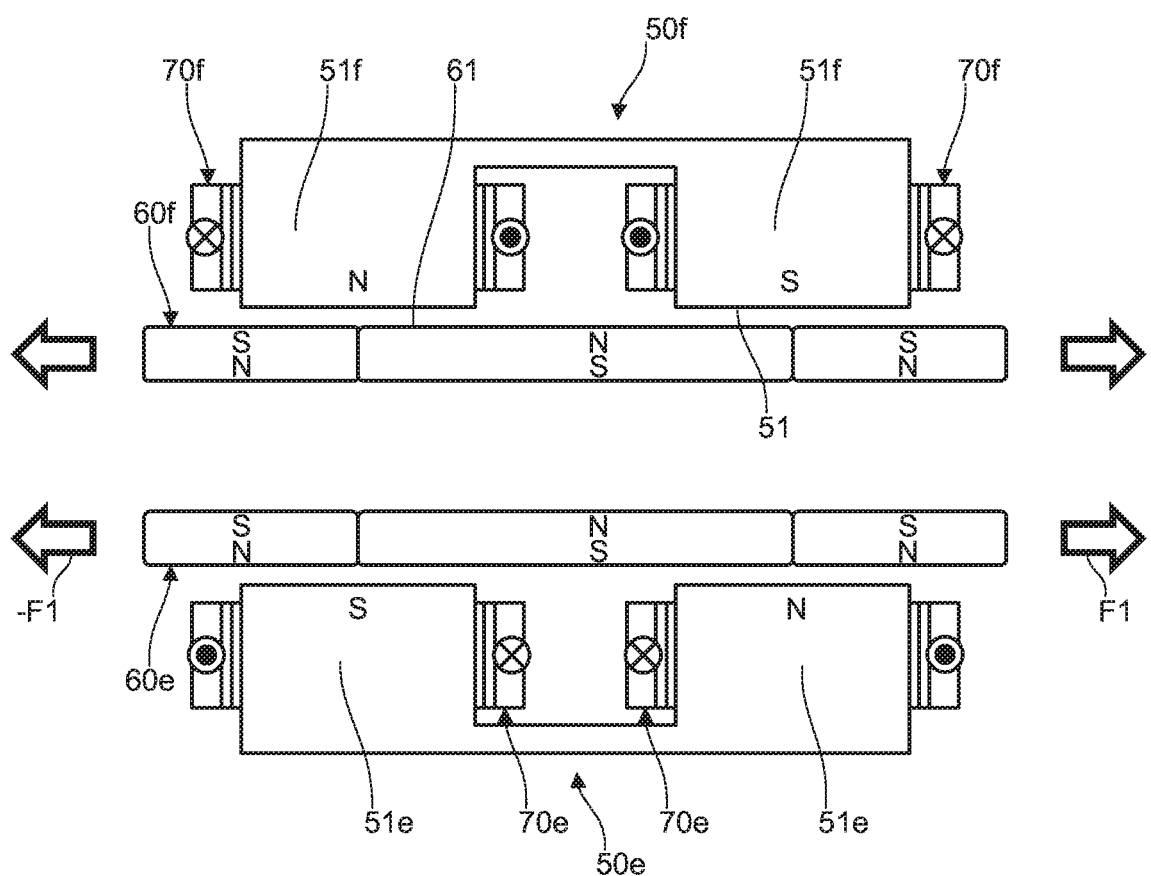
FIG. 26 is a plan view schematically illustrating the magnetic circuit of the vibration actuator.

FIG. 20 is an external view illustrating the configuration of a vibration actuator of Embodiment 3 according to the present invention, FIG. 21 is an exploded perspective view of the vibration actuator of Embodiment 3, and FIG. 22 is a plan view illustrating the inner configuration of the vibration actuator of Embodiment 3. FIG. 23 is an arrow cross-sectional view taken along line G-G in FIG. 20, and FIG. 24 is a cross-sectional view taken along line H-H in FIG. 22. Note that FIG. 23 illustrates vibration actuator 10B in a state of including cover 24A for convenience. FIG. 25A is a perspective view illustrating a movable body of the vibration actuator of Embodiment 3 according to the present invention, FIG. 25B is an arrow cross-sectional view taken along line J-J in FIG. 25A, and FIG. 26 is a plan view schematically illustrating a magnetic circuit of the vibration actuator.

Note that vibration actuator 10B of Embodiment 3 has a basic configuration similar to that of vibration actuator 10A corresponding to Embodiment 2 described in FIG. 11 to FIG. 19, but is mainly different in that the number of poles of the magnet disposed on one side of movable body 30B is three, the number of coils 70e and 70f wound around the cores is two (the magnetic poles are two poles), and shaft parts 801 and 802 are provided on movable body 30B side. The same components as those in vibration actuator 10A are referred to as the same names and denoted by the same reference characters, and description thereof is omitted.

<Entire Configuration of Vibration Actuator 10B>

Vibration actuator 10B illustrated in FIG. 20 has a flat plate-like shape in which the height (the length in the vertical direction in the accompanying drawings and corresponds to the thickness) is shorter than the width (the crosswise direction in FIG. 20).

As illustrated in FIG. 20, vibration actuator 10B of this embodiment includes fixing body 20B, shaft parts 801 and 802, and movable body 30B movably supported via shaft parts 801 and 802.

Movable body 30B reciprocates, that is, vibrates along the axial direction of shaft parts 801 and 802 in cooperation with magnets 60e and 60f that are disposed across the shafts of shaft parts 801 and 802, and cores 50e and 50f that are disposed so as to face magnets 60e and 60f over predetermined intervals (air gaps) and has protruding parts 51e and 51f around which coils 70e and 70f are wound.

Magnets 60e and 60f and cores 50e and 50f including coils 70e and 70f are disposed so that magnetic pole surfaces (the magnets correspond to magnetized surfaces) 61 and 51 thereof face each other. Magnets 60e and 60f and cores 50e and 50f around which coils 70e and 70f are wound form magnetic force generating parts, and the magnetic force generating parts function as magnetic springs by means of the magnetic attraction forces on both sides of shaft parts 801 and 802. As a result, movable body 30B is elastically supported in a state in which the rotation about the shaft is suppressed and so as to be movable in the axial direction. The magnetic attraction forces are generated so as to be symmetrical about the shafts of shaft parts 801 and 802 across the shafts of shaft parts 801 and 802. Movable body 30B is attracted toward both sides (the directions in opposite directions on a straight line orthogonal to the shaft parts) by the magnetic attraction forces generated on both sides of movable body 30B. Therefore, the magnetic attraction forces offset each other, to thereby be balanced. As a result, the rotation of movable body 30B is suppressed and movable body 30B is held in a position in which movable body 30B is in a horizontal state that is a reference position. In this embodiment, as with Embodiment 2, metal springs 40a and 40a that elastically support movable body 30B so that movable body 30B is returnable when movable body 30B moves in the axial direction are included in addition to the magnetic springs.

In vibration actuator 10B of this embodiment, shaft parts 801 and 802 are fixed to movable body 30B so as to protrude to the axial direction from the center of the end parts on the vibration sides, and the protruding end-part sides of shaft parts 801 and 802 are movably mounted on fixing body 20B.

Fixing body 20B includes case 21A, bearing holders 23c and 23d that accommodate bearing parts 82a and 82b (see FIG. 23), coils 70e and 70f, cores 50e and 50f each having slits formed in one surface of a rectangular shape and having coils 70e and 70f disposed in the slits, and power supply section 25Aa. In fixing body 20B, an opening part opened upward in case 21A of fixing body 20B is covered with cover 24A.

Meanwhile, movable body 30B includes pair of magnets 60e and 60f in which a plurality of magnetic poles (three poles in this embodiment) are alternately disposed in the longitudinal direction, and movable body main body 32A to which magnets 60e and 60f and spring receiving parts 84 are fixed. Movable body 30B is elastically supported by metal springs 40a. Metal springs 40a are cylindrical coil springs, for example, through which shaft parts 801 and 802 are inserted, and are interposed between movable body 30B and bearing holders 23c and 23d (in detail, bearing parts 82a and 82b). As with Embodiment 2, on movable body 30B sides, metal springs 40a are received by spring receiving parts 84 disposed in the centers of the end parts (front and rear projecting parts 323 and 324 illustrated in FIG. 23) of movable body 30B that are separated from each other in the vibration direction.

In vibration actuator 10B, movable body 30B (magnets 60e and 60f and movable body main body 32A) is elastically supported by the biasing forces of metal springs 40a in the axial direction, and the magnetic springs by means of the magnetic attraction forces generated by magnets 60e and 60f and cores 50e and 50f around which coils 70e and 70f are wound. Note that it is possible to elastically support movable body 30B by only the magnetic attraction forces that are so-called magnetic springs between cores 50e and 50f and magnets 60e and 60f.

In Embodiment 3, as compared to the configuration of vibration actuator 10A of Embodiment 2, only the configuration of cores 50e and 50f around which the coils are wound in fixing body 20B and the configuration of magnets 60e and 60f in movable body 30B are different.

Cores 50e and 50f are disposed in case 21A formed in a rectangular box shape having a bottom surface part on both side walls thereof along the longitudinal direction so as to face each other.

Cores 50e and 50f are magnetic bodies in this embodiment, and are formed in same shapes that are symmetrical about the shaft of shaft part 80. Cores 50e and 50f are disposed in case 21A so as to face each other across movable body 30B. Cores 50e and 50f include plurality of protruding parts (magnetic poles) 51e and 51f, which protrude from one side surface in a lined up manner and whose distal end surfaces serve as magnetic pole surfaces 51. Note that magnetic pole surfaces 51 are disposed so as to be parallel to shaft parts 801 and 802 and both side walls 21Aa and 21Ab (see FIG. 21) of case 21A, and be parallel to magnetic pole surfaces 61 of magnets 60e and 60f.

In cores 50e and 50f, coils 70e and 70f are disposed so as to be wound around the outer peripheries of two protruding parts 51e and 51f. When coils 70e and 70f are excited by carrying electric current, the two protruding parts in cores 50e and 50f are excited in different polarities. Note that, for cores 50e and 50f, the magnetic pole surfaces (magnetic poles) of protruding parts 51e and 51f facing each other across the shafts of shaft parts 801 and 802 are preferred to be excited in different polarities. As a result, the magnetic circuit configuration in vibration actuator 10B becomes efficient.

Coils 70e and 70f are wound around all protruding parts 51e and 51f in cores 50e and 50f and are connected to power supply section 25Aa. Coils 70e and 70f excite protruding parts 51e and 51f by being supplied with electric power from power supply section 25Aa, and polarities of adjacent protruding parts 51e and 51f have different polarities in cores 50e and 50f. In this embodiment, coils 70e and 70f excite protruding parts 51e and 51f in cores 50e and 50f around which coils 70e and 70f are wound in different polarities, and excite protruding parts 51e of cores 50e and protruding parts 51f of cores 50f facing each other across shaft parts 801 and 802 in different polarities.

Power supply section 25Aa is a board that supplies electric power to coils 70e and 70f, and is formed from a board, for example, a flexible circuit board (FPC: Flexible printed circuits) and the like connected to an external power supply. Power supply section 25Aa is disposed on sides of both end walls of case 21A, and is disposed on bearing holders 23c and 23d.

<Movable Body 30B of Vibration Actuator 10B>

As illustrated in FIG. 20 and FIG. 22, movable body 30B is disposed so as to be movable in the axial direction of shaft parts 801 and 802 in case 21A in fixing body 20B. Movable body 30B includes movable body main body 32A, magnets 60e and 60f, and spring receiving parts 84.

In movable body main body 32A, the configuration of magnets 60e and 60f that are disposed across the shafts of shaft parts 801 and 802 is different from movable body main body 32A of Embodiment 2. Note that shaft parts 801 and 802 are fixed to movable body main body 32A along the axial center of movable body main body 32A.

Magnets 60e and 60f include magnetic pole surfaces 61 serving as a plurality of magnetic poles, and are disposed so that magnetic pole surfaces 61 face the opposite sides and the shafts of shaft parts 801 and 802 are located therebetween. In this embodiment, magnets 60e and 60f are fixed on both side surfaces of movable body main body 32A through which shaft parts 801 and 802 are inserted along the longitudinal direction so as to be parallel to the shafts of shaft parts 801 and 802 and so that magnetic pole surfaces 61 face both sides. Only the magnetized directions of magnets 60e and 60f are different, and magnets 60e and 60f are formed in the same shape. In this embodiment, as illustrated in FIG. 20 to FIG. 23, FIG. 25, and FIG. 26, three different magnetic poles are alternately disposed on magnetic pole surfaces 61. In this embodiment, magnets 60e and 60f are disposed so that different magnetic poles are positioned in opposite directions in a direction orthogonal to the shafts of shaft parts 801 and 802 (see FIG. 26). Magnets 60e and 60f are disposed so as to face magnetic pole surfaces 51 and 51 of cores 50e and 50f, and line up with alternately different polarities in the longitudinal direction (axial center direction) of case 21A. Note that magnets 60e and 60f may be formed from alternately lining up different magnets (magnet pieces) with a plurality of magnetic poles, or may be magnetized so as to have alternately different magnetic properties.

Magnetic pole surfaces 61 are disposed so as to face magnetic pole surfaces 51 of cores 50e and 50f over predetermined intervals (air gaps) and be parallel to magnetic pole surfaces 51.

As with Embodiments 1 and 2, as illustrated in FIG. 24, magnetic pole surfaces 61 of magnets 60e and 60f are each formed in a center-protruding shape that is a trapezoidal shape or a curved surface in which the center part in the height direction is the closest to facing magnetic pole surface 51. In this embodiment, magnetic pole surfaces 61 are each formed in a curved surface in which the center part in the height direction is the closest to magnetic pole surfaces 51. As a result, the force (torque) that stops movable body 30B with respect to the rotation direction acts on movable body 30B so as to stop movable body 30B in the center in the rotation direction, and the effects similar to those of magnets 60a to 60d in Embodiments 1 and 2 can be obtained.

In this configuration, cores 50e and 50f are excited when coils 70e and 70f are supplied with power supply from power supply section 25Aa. Distal end surfaces of protruding parts 51e and 51f are magnetized, to thereby have magnetic poles, and thrust is generated in accordance with the relationship between the magnetic poles of magnets 60e and 60f disposed so as to face each other.

In this embodiment, for example, as illustrated in FIG. 26, the polarities (magnetic pole surfaces 61) of magnet 60e on the side facing core 50e are disposed in the order of an N pole, an S pole, and an N pole from the front side to the rear side, and are disposed so as to be lined up in the longitudinal direction while facing magnetic pole surface 51 of core 50e. Meanwhile, the polarities (magnetic pole surfaces 61) of magnet 60f facing core 50f are disposed in the order of an S pole, an N pole, and an S pole from the front side to the rear side, and are disposed so as to be lined up in the longitudinal direction while facing magnetic pole surface 51 of core 50f. As described above, in this embodiment, the number of polarities of magnets 60e and 60f and cores 50e and 50f facing each other is 3 for the magnet: 2 for the core.

Electric current is supplied to coils 70e and 70f of cores 50e and 50f. Coils 70e and 70f supplied with the electric current excite cores 50e and 50f as illustrated in FIG. 26. As a result, among two protruding parts 51e of core 50e facing magnet 60e, the protruding part on the front side in the vibration direction is magnetized as an S pole and protruding part 51e on the rear side is magnetized as an N pole. At the same time, among two protruding parts 51f of core 50f facing magnet 60f, the protruding part on the front side in the vibration direction is magnetized as an N pole and the protruding part on the rear side is magnetized as an S pole. As a result, by the magnetic attraction force, thrust is generated in direction F1, and cores 50e and 50f are driven in direction F1. By supplying electric current to coils 70e and 70f in the opposite direction, the polarities of cores 50e and 50f are caused to be opposite. In other words, the polarity of protruding part 51e on the front side of core 50e facing magnet 60e in the vibration direction is caused to be an N pole, protruding part 51e on the rear side thereof in the vibration direction is caused to be an S pole, the polarity of protruding part 51f on the front side of core 50f facing magnet 60f in the vibration direction is caused to be an S pole, and protruding part 51f on the rear side thereof in the vibration direction is caused to be an N pole. As a result, movable body 30B including magnets 60e and 60f that face the above is driven in direction −F1 that is directly opposite to direction F1.

By repeating the above, magnet 60B of movable body 30B vibrates in a reciprocating manner in both directions F (direction F1 and direction −F1) in the longitudinal direction with reference to the position serving as the driving reference position, that is, the position in which the center of magnetic pole surface 61 in the longitudinal direction and the center positions of cores 50e and 50f in the longitudinal direction overlap each other and is the position of movable body 30B illustrated in FIG. 20, FIG. 22, FIG. 23, and FIG. 26 here. Note that the driving principle is an operating principle similar to that of vibration actuator 10 in Embodiment 1 realized by expressions 1, 2, and 3 described above.

According to vibration actuator 10B, the following effects can be exhibited in addition to effects similar to <Effect 1>, <Effect 2>, and <Effect 4> to <Effect 8> described above.

In vibration actuator 10B of this embodiment, on both sides of movable body main body 32A of movable body 30B, two coils 70e and two coils 70f for excitation are wound around cores 50e and 50f that are disposed across the shafts of shaft parts 801 and 802.

As a result, in case 21A, on both sides of movable body 30B, the space in which cores 50e and 50f and coils 70e and 70f are disposed can be reduced, the weight of movable body 30B (for example, movable body main body 32A) can be easily increased, and the vibration output can be increased.

As compared to the configuration in which one coil is used on one side, the degree of freedom in designing the coils increases, the vibration output can be increased, and actuator 10B itself can be thinner.

Embodiment 4

Figure 27:
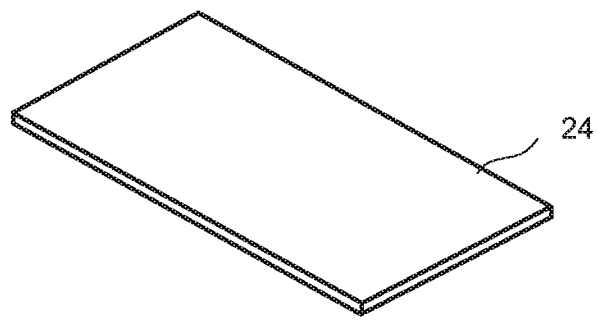
FIG. 27 is a perspective view illustrating the inner configuration of a vibration actuator of Embodiment 4 according to the present invention.
Figure 27:
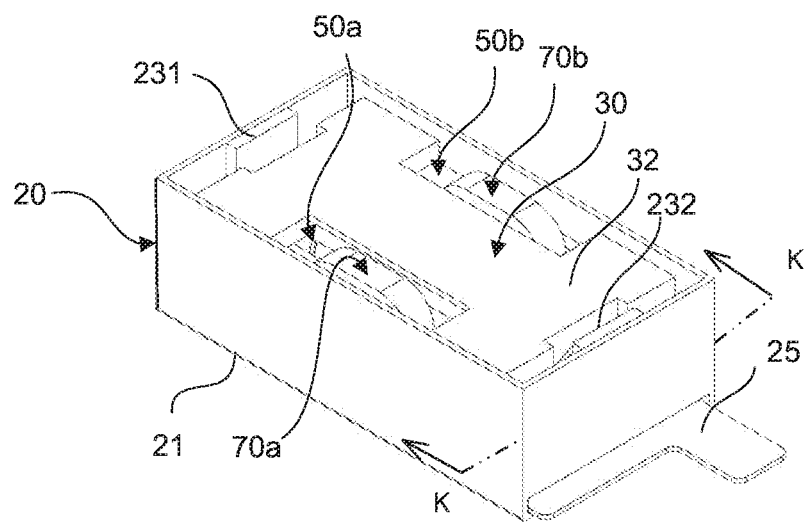
Figure 28:
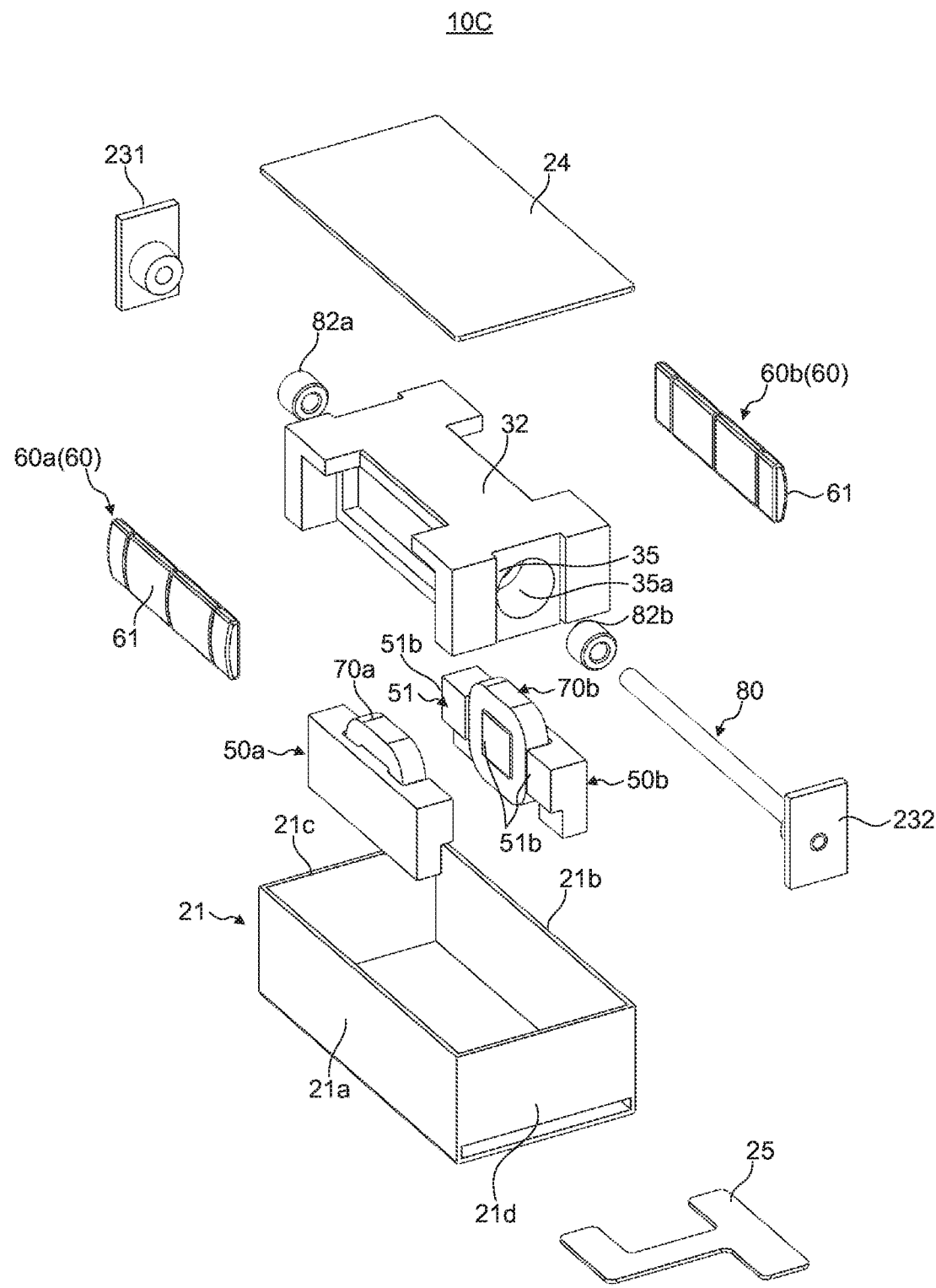
FIG. 28 is an exploded perspective view of the vibration actuator of Embodiment 4 seen from above.
Figure 29:
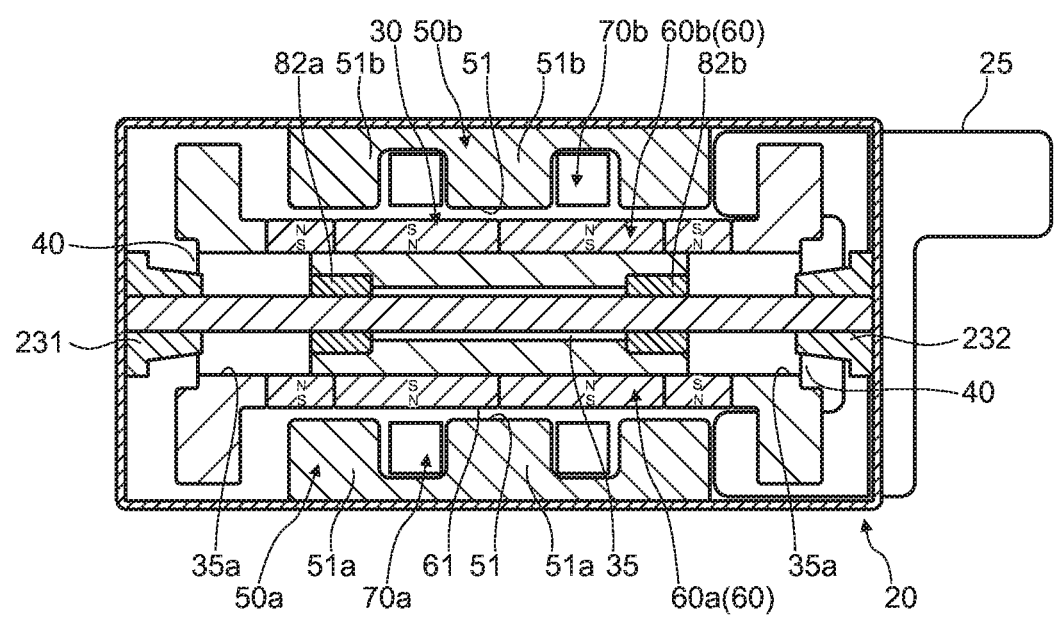
FIG. 29 is an arrow cross-sectional view taken along line K-K in FIG. 27.

FIG. 27 is a perspective view illustrating the inner configuration of a vibration actuator of Embodiment 4 according to the present invention, and FIG. 28 is an exploded perspective view of the vibration actuator of Embodiment 4 seen from above. FIG. 29 is an arrow cross-sectional view taken along line K-K in FIG. 27.

Vibration actuator 10C of Embodiment 4 illustrated in FIG. 27 to FIG. 29 is a vibration actuator having a configuration in which metal springs 40 are removed from vibration actuator 10 of Embodiment 1 illustrated in FIG. 1 to FIG. 10. Therefore, for vibration actuator 10C, components similar to those of vibration actuator 10 corresponding to Embodiment 1 are denoted by the same reference characters, and overlapping description thereof is omitted below.

As with vibration actuator 10, vibration actuator 10C includes fixing body 20, shaft part 80, and movable body 30 movably supported with respect to fixing body 20 via shaft part 80.

Fixing body 20 includes, in case 21, shaft holding parts 231 and 232, coils 70a and 70b, and E-shaped cores 50a and 50b including a plurality of protruding parts including protruding parts (magnetic pole parts) 51a, 51b around which coils 70a and 70b are wound. Fixing body 20 further includes power supply section 25 that supplies power supply to coils 70a and 70b.

Case 21 is formed in a rectangular box shape having a bottom surface part, and E-shaped cores 50a and 50b are disposed on both side walls along the longitudinal direction so as to face each other. In case 21, shaft part 80 is installed between both end walls 21c and 21d that close both end parts of each of both side walls 21a and 21b via shaft holding parts 231 and 232 provided on the inner sides of both end walls 21c and 21d.

Shaft holding parts 231 and 232 are used as parts having the function of holding both end parts of shaft part 80. Note that spring holders 23a and 23b in Embodiment 1 also have the function of receiving the biasing forces of metal springs 40 by inserting one of end parts of metal springs 40 in addition to the function of holding both end parts of shaft part 80.

Movable body 30 includes pair of magnets 60a and 60b in which a plurality of magnetic poles (four poles in this embodiment) are alternately disposed in the longitudinal direction, and movable body main body 32 to which magnets 60a and 60b and bearing parts 82a and 82b are fixed.

As in vibration actuator 10, in vibration actuator 10C, shaft part 80 to be fixed to fixing body 20 is inserted in bearing parts 82a and 82b in movable body 30. In movable body 30, magnets 60a and 60b are provided on both side parts along the axial direction across the shaft of shaft part 80. E-shaped cores 50a and 50b are provided in positions that face magnets 60a and 60b via air gaps. Magnets 60a and 60b and E-shaped cores 50a and 50b around which coils 70a and 70b are wound are disposed so that magnetic pole surfaces 61 and 51 thereof face each other. Magnetic pole surfaces 61 of magnets 60a and 60b are disposed toward the outside in the direction orthogonal to the shaft of shaft part 80, and the magnetized surfaces of E-shaped cores 50a and 50b face each other so as to be opposite thereto.

The magnetic force generating parts formed from magnets 60a and 60b and cores 50a and 50b around which coils 70a and 70b are wound function as magnetic springs by means of the magnetic attraction forces on both sides of shaft part 80. The magnetic attraction forces in the magnetic circuit configuration are generated on the same straight line across shaft part 80 and in opposite directions in separating directions, and hence offset each other. By the magnetic attraction forces, the inclination of movable body 30 that pivots around shaft part 80 is removed, movable body 30 is placed in a positioned state (the positioning of the movable body), and the rotation about shaft part 80 is restricted (so-called rotation stop). Magnetic pole surfaces 61 of magnets 60a and 60b are formed in center-protruding shapes in which the center parts in the height direction or the rotation direction are the closest to magnetic pole surfaces 51 of E-shaped cores 50a and 50b. Therefore, movable body 30 is disposed in a position in which movable body 30 is not inclined and pivots around shaft part 80 without being attracted to one side of E-shaped cores 50a and 50b located across movable body 30, that is, disposed in a substantially horizontal and stable state.

As described above, in vibration actuator 10C, the magnetic attraction forces are generated on both sides of movable body 30 so as to be symmetrical about shaft part 80 (the shaft of shaft part 80) across shaft part 80 (the shaft of shaft part 80). As a result, movable body 30 is attracted toward both sides. Therefore, the magnetic attraction forces offset each other, to thereby be balanced. As a result, the rotation of movable body 30 is suppressed and movable body 30 is held in a position in which movable body 30 is in a horizontal state that is a reference position.

As a result, movable body 30 is elastically supported in a state in which the rotation about the shaft is suppressed and so as to be movable in the axial direction by the magnetic spring structure formed from E-shaped cores 50a and 50b around which coils 70a and 70b are wound and magnets 60.

Movable body 30 reciprocates, that is, vibrates along the axial direction of shaft part 80 in cooperation with E-shaped cores 50a and 50b around which coils 70a and 70b are wound and magnets 60 by supplying power supply to coils 70a and 70b from power supply section 25. Specifically, as with vibration actuator 10, movable body 30 including magnets 60a and 60b reciprocates (vibrates in a reciprocating manner) in the longitudinal direction that is the axial direction, that is, the vibration direction by changing the direction of the electric current to be supplied to coils 70a and 70b. Note that the driving principle of vibration actuator 10C of this embodiment is an operating principle similar to that of vibration actuator 10 in Embodiment 1 realized by expressions 1, 2, and 3 described above.

As with Embodiment 1, magnetic pole surfaces 61 of magnets 60a and 60b is formed in a curved surface in which the center part in the height direction is the closest to the magnetic pole surface. Therefore, the force (torque) that stops movable body 30 with respect to the rotation direction acts on movable body 30 so as to stop movable body 30 in the center in the rotation direction, movable body 30 can be placed in a state in which movable body 30 is disposed so as to be substantially horizontal and stable, and effects (mainly <Effect 1> to <Effect 3>, <Effect 5>, and <Effect 6>) similar to those in Embodiment 1 can be obtained. In addition, in vibration actuator 10C, coils 70a and 70b excite center protruding parts 51a and 51b of E-shaped cores 50a and 50b, and center protruding parts 51a and 51b generate thrust by the magnetic attraction forces with magnets 60a and 60b together with protruding parts 51a and 51b on both sides of center protruding parts 51a and 51b. Therefore, as with Embodiment 1, the electromagnetic conversion efficiency can be improved as compared to the VCM types of the related art having a large magnetic resistance. According to this embodiment, the movable direction of movable body 30 is the longitudinal direction of vibration actuator 10C, and hence the clearance necessary for the stroke can be easily secured, and the output can be increased.

Embodiment 5

Figure 30:
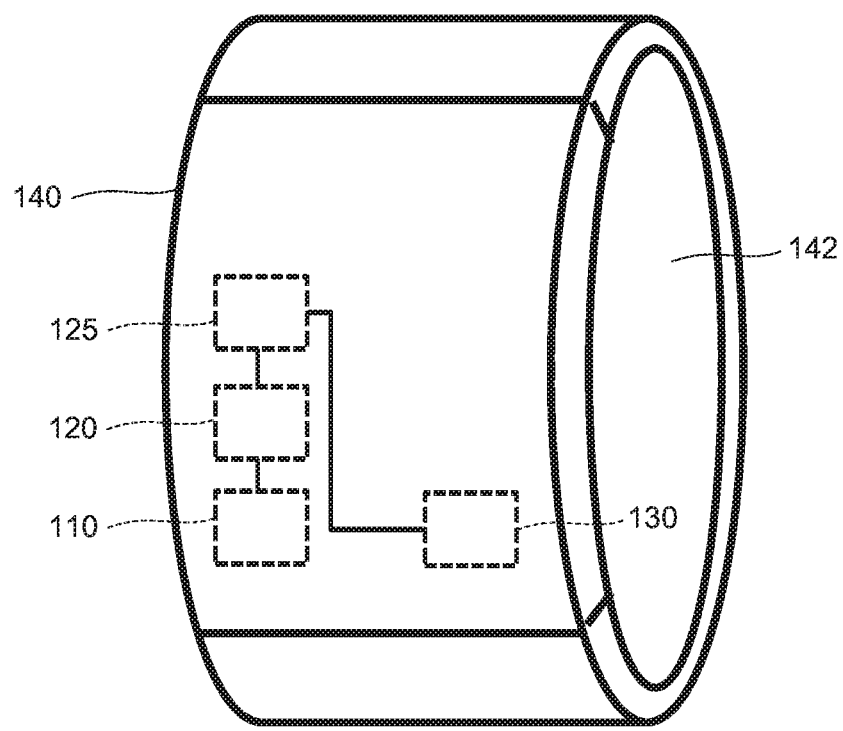
FIG. 30 schematically illustrates a main part configuration of a wearable terminal of Embodiment 5 according to the present invention.

FIG. 30 schematically illustrates a main part configuration of wearable terminal 100 of Embodiment 5 according to the present invention. Wearable terminal 100 is used by being worn by the user. Wearable terminal 100 functions here as a so-called wearable input device that notifies the user wearing wearable terminal 100 of the incoming in a connected communication terminal by vibration.

Wearable terminal 100 illustrated in FIG. 30 includes communication apparatus 110, processing apparatus 120, vibration actuator 130 serving as a driving apparatus, and casing 140. One of vibration actuators 10, 10A, 10B, or 10C described in Embodiments 1 to 4 is applied to vibration actuator 130. The bottom surface of vibration actuator 130 is disposed near inner peripheral surface 142 of casing 140. Vibration actuators 10, 10A, 10B, and 10C described in Embodiments 1 to 4 are mounted on wearable terminal 100.

Casing 140 is formed in a ring shape, and is worn on a finger or a thumb of the user here. At this time, the bottom surface of vibration actuator 130 is positioned to overlap the ball part of the finger or the thumb that is the wearing part. As a result, vibration actuator 130 is worn so as to be in close contact with parts that are dense with mechanoreceptors. Communication apparatus 110 is connected to a wireless communication terminal (not shown) such as a mobile phone, a smartphone, and a portable game machine in wireless communication, for example, receives a signal from the wireless communication terminal, and outputs the signal to processing apparatus 120.

In communication apparatus 110, for example, the signal from the wireless communication terminal is an incoming signal and the like of the wireless communication terminal received by communication systems such as Bluetooth®, for example. In processing apparatus 120, the input signal is converted to a drive signal of vibration actuator 130 by a conversion circuit section, and the drive signal is supplied to vibration actuator 130 via drive circuit section 125 connected to power supply section (electric power supply control sections 25, 25A, and 25Aa of vibration actuators 10, 10A, 10B, and 10C) of vibration actuator 130 (10, 10A, 10B, and 10C). As a result, vibration actuator 130 is driven. Then, the movable body vibrates and wearable terminal 100 vibrates. Casing 140 of wearable terminal 100 is formed in a ring shape, and the movable body vibrates in a reciprocating manner along the bottom surface of vibration actuator 130 (corresponding to the bottom surface of case 21). As a result, the vibration generated by the reciprocating and sliding movement of the movable body is directly transmitted to the mechanoreceptors from the bottom surface. As a result, as compared to the configuration in which the vibration actuator is disposed on the rear side of a fingers or a thumb, or the vibration actuator is disposed in a position separated from the ball part of the finger or the thumb, for example, a position rising from the ball part, the vibration felt by the user can be further increased with a predetermined size without changing the outer shape.

The shape of wearable terminal 100 can be downsized, and the sense of use when wearable terminal 100 is used can be improved without discomfort. Note that wearable terminal 100 may be a device with incoming notification function including communication apparatus 110, processing apparatus 120, and vibration actuator 130 serving as driving apparatus. As a result, the device with incoming notification function may have a configuration in which the user is notified of the incoming from the outside acquired by a wireless communication terminal such as a mobile phone, a smartphone, and a portable game machine by driving the vibration actuator. The vibration of vibration actuator 130 can be applied to the user by increasing the vibration as vibration corresponding to the signal input to the information communication terminal from an external apparatus such as an email, and vibration according to the operation of a game as the vibration for bodily sensation besides the incoming signal. Note that a function that enables characters or numbers to be input in a wirelessly connected apparatus or information displayed on a connected displayer such as a display to be selected by only moving wearable terminal 100 so as to write a character in air may be provided in wearable terminal 100.

Figure 31:
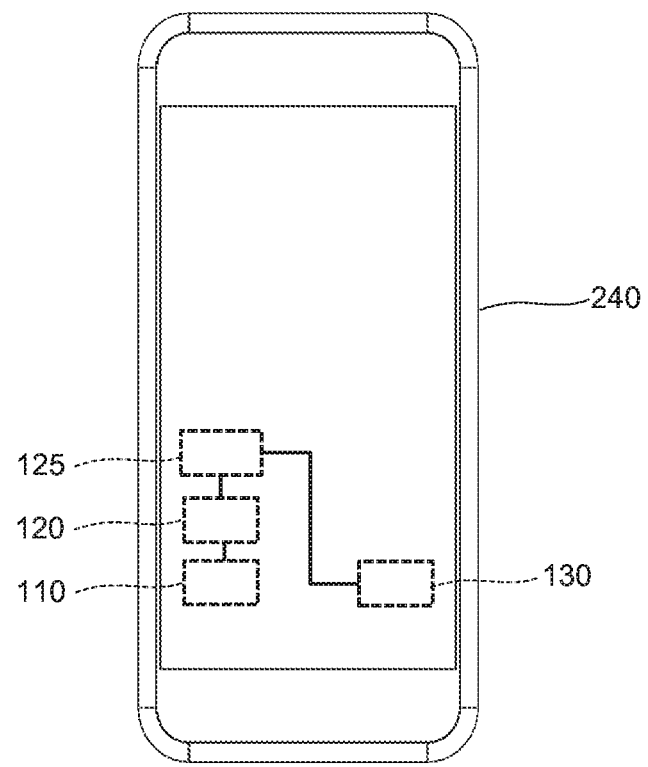
FIG. 31 schematically illustrates a main part configuration of a mobile terminal as a modified example of Embodiment 5 according to the present invention.

As illustrated in FIG. 31, actuator 130 to which any of vibration actuators 10, 10A, 10B, and 10C described in Embodiments 1 to 4 is applied can have the similar effects even when actuator 130 is mounted on mobile terminal 200. As with wearable terminal 100, mobile terminal 200 includes communication apparatus 110, processing apparatus 120, drive circuit section 125, and vibration actuator 130 serving as a driving apparatus in casing 240. In mobile terminal 200, by vibrating vibration actuator 130, a signal for each function of mobile terminal 200 can be processed by processing apparatus 120, and the user can be notified of the signal by vibrating vibration actuator 130 via drive circuit section 125 in addition to the incoming from the outside acquired by a wireless communication terminal such as a mobile phone, a smartphone, and a portable game machine.

Vibration actuators 10, 10A, 10B, and 10C in Embodiments 1 to 4 may have configurations in which coils 70a and 70b, 70c, 70d, 70e, and 70f, E-shaped cores 50a and 50b, 50c, and 50d, and cores 50e and 50f are provided in movable body 30, 30A, and 30B, and magnets 60a and 60b, 60c, 60d, 60e, and 60f are disposed in fixed bodies 20, 20A, and 20B. Note that the relationships between those magnets and E-shaped cores or cores around which coils are wound are similar to those in the embodiments.

It is to be understood that the embodiments disclosed above are merely examples in all aspects and in no way intended to limit the present invention. The scope of the present invention is defined by the appended claims and not by the description above, and changes made within the scope and spirit equivalent to those of the claims are duly included in the present invention. The embodiments of the present invention are described above. Note that the description above is examples of suitable embodiments of the present invention, and the scope of the present invention is not limited thereto. In other words, the description of the configurations of the apparatuses and the shapes of the sections above are examples, and it is apparent that various changes and additions can be made for those examples within the scope of the present invention.

The disclosure of the specification, the accompanying drawings, and the abstract included in Japanese Patent of Japanese Patent Application No. 2016-247226 filed on Dec. 20, 2016 is incorporated in this application by reference in its entirety.

INDUSTRIAL APPLICABILITY

The vibration actuator according to the present invention has an effect of being able to be downsized and vibrating suitably and efficiently, and is useful as a wearable terminal that can communicate with an information communication terminal and a device with incoming notification function that notifies a user of an incoming notification in the information communication terminal such as a mobile phone by providing bodily sensation.

REFERENCE SIGNS LIST 10, 10A, 10B, 10C, 130 Vibration actuator
20, 20A, 20B Fixing body
21, 21A Case
21a, 21b, 21Aa, 21Ab Side wall
21c, 21d, 21Ac, 21Ad End wall
23a, 23b Spring holder
23c, 23d Bearing holder
24, 24A Cover
25, 25A, 25Aa Power supply section
26 Buffer part
30, 30A, 30B Movable body
32, 32A Movable body main body
35 Through hole
35a Spot facing part
40, 40a Metal spring
50a, 50b, 50c, 50d E-shaped core (core)
50e, 50f Core
51 Magnetic pole surface (magnetic pole, magnetized)
51a, 51b, 51c, 51d, 51e, 51f Protruding part
61 Magnetic pole surface
60a, 60b, 60c, 60d, 60e, 60f Magnet
70a, 70b, 70c, 70d, 70e, 70f Coil
80, 801, 802 Shaft part (support shaft part)
82a, 82b Bearing part
84 Spring receiving part
100 Wearable terminal
110 Communication apparatus
120 Processing apparatus
125 Drive circuit section
140, 240 Casing
142 Inner peripheral surface
200 Mobile terminal
231, 232 Shaft holding part
322 Body
323 Front projecting part
323a, 324a Spot facing part
324 Rear projecting part

What is claimed is:

1. A vibration actuator, comprising:
a fixing body;
a support shaft part fixed to the fixing body;
a movable body to be movably supported with respect to the fixing body via the support shaft part; and
a magnetic force generating part, wherein:
a first part of the magnetic force generating part is provided respectively on both sides of the movable body across a shaft of the support shaft part,
a second part of the magnetic force generating part is provided in the fixing body with magnetic pole surfaces of the second part facing respective magnetic pole surfaces of the first part,
the movable body is elastically supported by a magnetic attraction force generated along a direction orthogonal to the shaft between the magnetic pole surfaces of the first part and the second part respectively on both sides across the shaft, and vibrates in a reciprocating manner in an axial direction of the support shaft part by a magnetic attraction force generated along the axial direction by excitation of one of the first part and the second part caused, and
the movable body comprises a bearing part in which the support shaft part is inserted, the movable body being movably supported by the support shaft part via the bearing part.

2. The vibration actuator according to claim 1, wherein:
the first part is one of a set of magnets or electromagnetic cores, the electromagnetic cores being cores each provided with a coil,
the second part is another of the set of magnets or electromagnetic cores,
the magnetic attraction force generated along the direction orthogonal to the shaft is generated between the magnets and the cores, and
the magnetic attraction force generated along the axial direction is generated by excitation of the coil caused by supplying electric power, and the movable body vibrates in a reciprocating manner in the axial direction of the support shaft part with respect to the fixing body by the coil cooperating with the magnet.

3. The vibration actuator according to claim 2, wherein:
the magnetic pole surfaces of the first part is provided respectively on both sides of the support shaft across a shaft of the support shaft part and to disposed outwardly in a direction orthogonal to the shaft of the support shaft part,
the second part is provided in the fixing body with magnetic pole surfaces of the second part facing respective magnetic pole surfaces of the first part, the first part provided respectively on both sides of the support shaft across the shaft of the support shaft part.

4. The vibration actuator according to claim 1, further comprising a metal spring that elastically supports the movable body so that the movable body is movable with respect to the fixing body.

5. The vibration actuator according to claim 4, wherein the metal spring has a non-linear spring constant for displacement of the movable body with respect to the fixing body.

6. The vibration actuator according to claim 1, wherein:
the magnetic pole surface of the magnet is a magnetic pole surface magnetized in four poles in the axial direction;
the core comprises three magnetic pole parts that face the magnet, each of the three magnetic pole parts having a protruding shape and a distal end surface serving as the magnetic pole surface of the core; and
the coil surrounds a center magnetic pole part among the three magnetic pole parts.

7. The vibration actuator according to claim 1, wherein:
the magnetic pole surface of the magnet is a magnetic pole surface magnetized in four poles in the axial direction;
the core comprises three magnetic pole parts that face the magnet, each of the three magnetic pole parts having a protruding shape and a distal end surface serving as the magnetic pole surface of the core; and
the coil comprises a plurality of coils surrounding the three magnetic pole parts.

8. The vibration actuator according to claim 1, wherein:
the magnetic pole surface of the magnet is a magnetic pole surface magnetized in three poles in the axial direction;
the core comprises two magnetic pole parts facing the magnet, each of the two magnetic pole parts having a protruding shape and a distal end surface serving as the magnetic pole surface of the core; and
the coil comprises a plurality of coils surrounding the two magnetic pole parts.

9. The vibration actuator according to claim 1, wherein:
the magnetic pole surface of the magnet is formed in a center-protruding shape that is a trapezoidal shape or a curved surface so that a center part of a length in a direction about the shaft is closest to the magnetic pole surface of the core to which the magnetic pole surface of the magnet faces.

10. The vibration actuator according to claim 1, wherein the movable body includes a high specific-gravity metal material.

11. A wearable terminal on which the vibration actuator according to claim 1 is mounted.

12. A device with incoming notification function, comprising:
a communication apparatus mounted on the device, the communication apparatus being configured to receive a signal from outside; and
the vibration actuator according to claim 1 mounted on the device, the vibration actuator being configured to vibrate upon incoming in the communication apparatus.

13. A vibration actuator, comprising:
a fixing body;
a support shaft part; and
a movable body to be movably supported with respect to the fixing body via the support shaft part, wherein:
one of a set of magnets or cores is provided respectively on both sides of the movable body across a shaft of the support shaft part, the cores each comprising a magnetic pole surface disposed facing a magnetic pole surface of a corresponding one of the magnets via an air gap, the cores each being provided with a coil, wherein the magnetic pole surfaces of the one of the set of magnets or cores are disposed outwardly in a direction orthogonal to the shaft of the support shaft part,
another of the set of magnets or cores is provided in the fixing body so as to face the one of the set of magnets or cores disposed respectively on both sides of the shaft of the support shaft part in the movable body,
the movable body is elastically supported by a magnetic attraction force generated between the magnetic pole surfaces of the cores and the magnets respectively on both sides across the shaft, and vibrates in a reciprocating manner in an axial direction of the support shaft part with respect to the fixing body by the coil cooperating with the magnet by excitation of the coil caused by supplying electric power, and
the magnetic pole surface of the magnet is formed in a center-protruding shape that is a trapezoidal shape or a curved surface so that a center part of a length in a direction about the shaft is closest to the magnetic pole surface of the core to which the magnetic pole surface of the magnet faces.

14. The vibration actuator according to claim 13, further comprising a metal spring that elastically supports the movable body so that the movable body is movable with respect to the fixing body.

15. The vibration actuator according to claim 14, wherein the metal spring has a non-linear spring constant for displacement of the movable body with respect to the fixing body.

16. The vibration actuator according to claim 13, wherein:
the magnetic pole surface of the magnet is a magnetic pole surface magnetized in four poles in the axial direction;
the core comprises three magnetic pole parts that face the magnet, each of the three magnetic pole parts having a protruding shape and a distal end surface serving as the magnetic pole surface of the core; and
the coil surrounds a center magnetic pole part among the three magnetic pole parts.

17. The vibration actuator according to claim 13, wherein:
the magnetic pole surface of the magnet is a magnetic pole surface magnetized in four poles in the axial direction;
the core comprises three magnetic pole parts that face the magnet, each of the three magnetic pole parts having a protruding shape and a distal end surface serving as the magnetic pole surface of the core; and
the coil comprises a plurality of coils surrounding the three magnetic pole parts.

18. The vibration actuator according to claim 13, wherein:
the magnetic pole surface of the magnet is a magnetic pole surface magnetized in three poles in the axial direction;
the core comprises two magnetic pole parts facing the magnet, each of the two magnetic pole parts having a protruding shape and a distal end surface serving as the magnetic pole surface of the core; and the coil comprises a plurality of coils surrounding the two magnetic pole parts.

19. The vibration actuator according to claim 13, wherein:

the support shaft part is fixed to the movable body; and the fixing body comprises a bearing part in which the support shaft part is inserted, the fixing body being configured to movably support the movable body together with the support shaft part via the bearing part.

20. The vibration actuator according to claim 13, wherein:

the support shaft part is fixed to the fixing body; and the movable body comprises a bearing part in which the support shaft part is inserted, the movable body being movably supported by the support shaft part via the bearing part.

21. The vibration actuator according to claim 13, wherein the movable body includes a high specific-gravity metal material.

22. A wearable terminal on which the vibration actuator according to claim 13 is mounted.

23. A device with incoming notification function, comprising:

a communication apparatus mounted on the device, the communication apparatus being configured to receive a signal from outside; and the vibration actuator according to claim 13 mounted on the device, the vibration actuator being configured to vibrate upon incoming in the communication apparatus.

* * * * *